United States Patent [19]
Okumura et al.

[11] Patent Number: 6,164,844
[45] Date of Patent: Dec. 26, 2000

[54] POWER TRANSMISSION APPARATUS

[75] Inventors: Yoichiro Okumura, Hino; Michio Nagai, Hamura; Hiroshi Terada, Mitaka; Atsushi Maruyama, Machida, all of Japan

[73] Assignee: Olympus Optical Co., Ltd., Tokyo, Japan

[21] Appl. No.: 09/137,259

[22] Filed: Aug. 20, 1998

Related U.S. Application Data

[60] Continuation of application No. 08/759,033, Dec. 2, 1996, abandoned, which is a division of application No. 08/234,662, Apr. 28, 1994, abandoned.

[30] Foreign Application Priority Data

Apr. 30, 1993 [JP] Japan .................................. 5-028030
Apr. 30, 1993 [JP] Japan .................................. 5-128029
Apr. 30, 1993 [JP] Japan .................................. 5-128031
May 19, 1993 [JP] Japan .................................. 5-117184

[51] Int. Cl.$^7$ .............................. G03B 1/00; G03B 17/00; F16H 3/34; F16H 48/00

[52] U.S. Cl. ........................ 396/447; 396/413; 396/418; 74/354; 475/12; 475/15; 475/332

[58] Field of Search ...................................... 396/447, 413, 396/418, 144, 411, 48, 132; 74/353, 354; 475/12, 15, 332, 5, 6

[56] References Cited

U.S. PATENT DOCUMENTS

| 5,094,116 | 3/1992 | Shintani ................................... 74/354 |
| 5,365,301 | 11/1994 | Sugita et al. .......................... 396/144 |
| 5,752,096 | 5/1998 | Ichino et al. ........................ 396/418 X |

*Primary Examiner*—W. B. Perkey
*Attorney, Agent, or Firm*—Louis Weinstein

[57] ABSTRACT

The invention is directed to an engaging mechanism. The engaging mechanism comprises a cam element which moves upon modification of an engaging position, a cam follower abutted against a cam surface of the cam element, a detecting element for detecting a position of the cam follower, and a section to be detected provided on the cam follower, for giving at least three different kinds of output values to the detecting element.

18 Claims, 26 Drawing Sheets

POWER TRANSMISSION APPARATUS

This application is a continuation of application Ser. No. 08/759,033 filed Dec. 2, 1996, now abandoned, which is a division of application Ser. No. 08/234,662 filed Apr. 28, 1994 now abandoned.

BACKGROUND OF THE INVENTION

1. Field of the Invention

This invention relates to power transmission apparatuses and, more particularly, to a power transmission apparatus in which a unit motor is used to drive a plurality of driving systems in changing-over.

2. Related Art and Prior Art Statement

Conventionally, various kinds of drivingforce changing-over or switching mechanisms in which unit driving force is used drive a plurality of driving systems in changing-over have been proposed in equipment such as a camera or the like. For example, a driving-force changing-over mechanism for changing over driving force of a unit motor to a plurality of transmission mechanisms by normal and reverse rotational operation is disclosed in Japanese Patent Laid-Open No. HEI 1-287648.

This technical means is so arranged as to change over the motor such that a driving force of the unit motor is utilized as a driving source such as shutter charge, mirror driving and the like by operation in normal rotation of the technical means, and driving force of the motor is utilized as driving force for winding operation of a film and rewinding operation of the film by reverse rotational operation.

Further, technical means (first technical means) for performing clutch changing-over operation by rotation in one direction by a rotary clutch, and a non-driving mechanism is driven by rotation in the other direction has been proposed in Japanese Patent Laid-Open No. HEI 5-321986.

By the way, in such changing-over mechanism, positional detection of a changing-over element becomes an indispensable technique. However, in Japanese Patent Laid-Open No. HEI 5-321986, technical means (second technical means) has been proposed in which an initial position is detected by a length of a changing-over range of a cam which lifts a lever.

Moreover, the inventors of the present application have proposed technical means in Japanese Patent Application No. HEI 4-295139, in which portions different in reflectance or reflection factor from each other are provided on a portion of a cam which has a plurality of engaging positions, to thereby enable detection of an absolute position.

Meanwhile, a driving mechanism has been proposed in Japanese Patent Application No. HEI 3-309336, in which a unit motor is used to select a plurality of gears to be driven by combination of a sun gear and a planetary gear.

Furthermore, the inventors of the present application have proposed a changing-over mechanism in Japanese Patent Application No. HEI 4-268878, for detecting a resetting position from a pulse width of a signal during driving.

However, a complicated mechanism is required for the technical means disclosed in Japanese Patent Laid-Open No. HEI 1-287648, because an engaging element of the planetary gear is changed over by a section changing-over element. This makes it difficult to down-size or miniaturize equipment such as a camera or the like, and causes an increase in cost. Further, the first technical means which has been proposed in Japanese Patent Laid-Open No. HEI 5-321986 is difficult to detect an absolute position of a rotary clutch section.

Moreover, it is impossible for the second technical means proposed in Japanese Patent Laid-Open No. HEI 5-321986 to perform positional detection only in a case where an engaging mechanism moves at equal or constant speed. Furthermore, the second technical means cannot also detect an absolute position.

Further, such a deficiency occurs in the technical means proposed in Japanese Patent Application No. HEI 4-295139 that a sensor must be arranged in the vicinity of the cam so that layout is limited, and that, in a case of miniaturization, a detecting error increases so that it is impossible to make a section to be detected small.

Meanwhile, the technical means which has been proposed in Japanese Patent Application No. HEI 3-309336 is such that a series of release operations are performed after an initial gear of a driving system for driving an auto-focus lens has been selected, at the time of release operation. Therefore, release time lag occurs. Thus, the technical means causes deterioration of a feeling of operation.

Moreover, technical means which has been proposed in Japanese Patent Application No. HEI 4-268878 is not provided with means for detecting the initial position. Accordingly, once the initial position is mistaken by erroneous operation or the like, there is danger that the operation continues under this state. Furthermore, there is also danger that, under a stationary state, detection of the position becomes difficult.

OBJECTS AND SUMMARY OF THE INVENTION

It is a first object of the invention to provide a power transmission apparatus which can largely contribute downsizing and reduction in cost of the entirety of a camera.

It is a second object of the invention to provide a power transmission apparatus provided with an engaging mechanism which is simple in arrangement, which is high in stability, and which can surely or certainly detect an absolute position.

It is a third object of the invention to provide a power transmission apparatus which is provided with an engaging mechanism which can detect an absolute position by an arrangement which is extremely easy, in the engaging mechanism having a plurality of engaging positions.

It is a fourth object of the invention to provide a power transmission apparatus which is provided with an engaging mechanism which is stable and which is extremely strong also for a noise or the like.

It is a fifth object of the invention to provide a power transmission apparatus in a single-lens reflex camera, in which driving of a mechanism within a body which has normally used a pair of motors and a complicated clutch mechanism can be performed by a small size clutch which uses only a single motor and a single sensor.

Briefly, a power transmission apparatus according to the invention comprises:

an engaging mechanism which includes:
        a cam element moved upon changing of an engaging position;
        a cam follower abutted against a cam surface of the cam element;
        a detecting element for detecting a position of the cam follower; and
        a section to be detected, provided on the cam follower for providing at least three (3) kinds of output values to the detecting element.

These as well as other objects and advantages of the present invention will become further apparent from the following detailed explanation.

DETAILED DESCRIPTION OF THE PREFERRED EMBODIMENTS

Various embodiments of the invention will hereunder be described with reference to the accompanying drawings.

The embodiments in which the invention is applied to a so-called single-lens reflex camera will hereunder be described.

Figure 1:
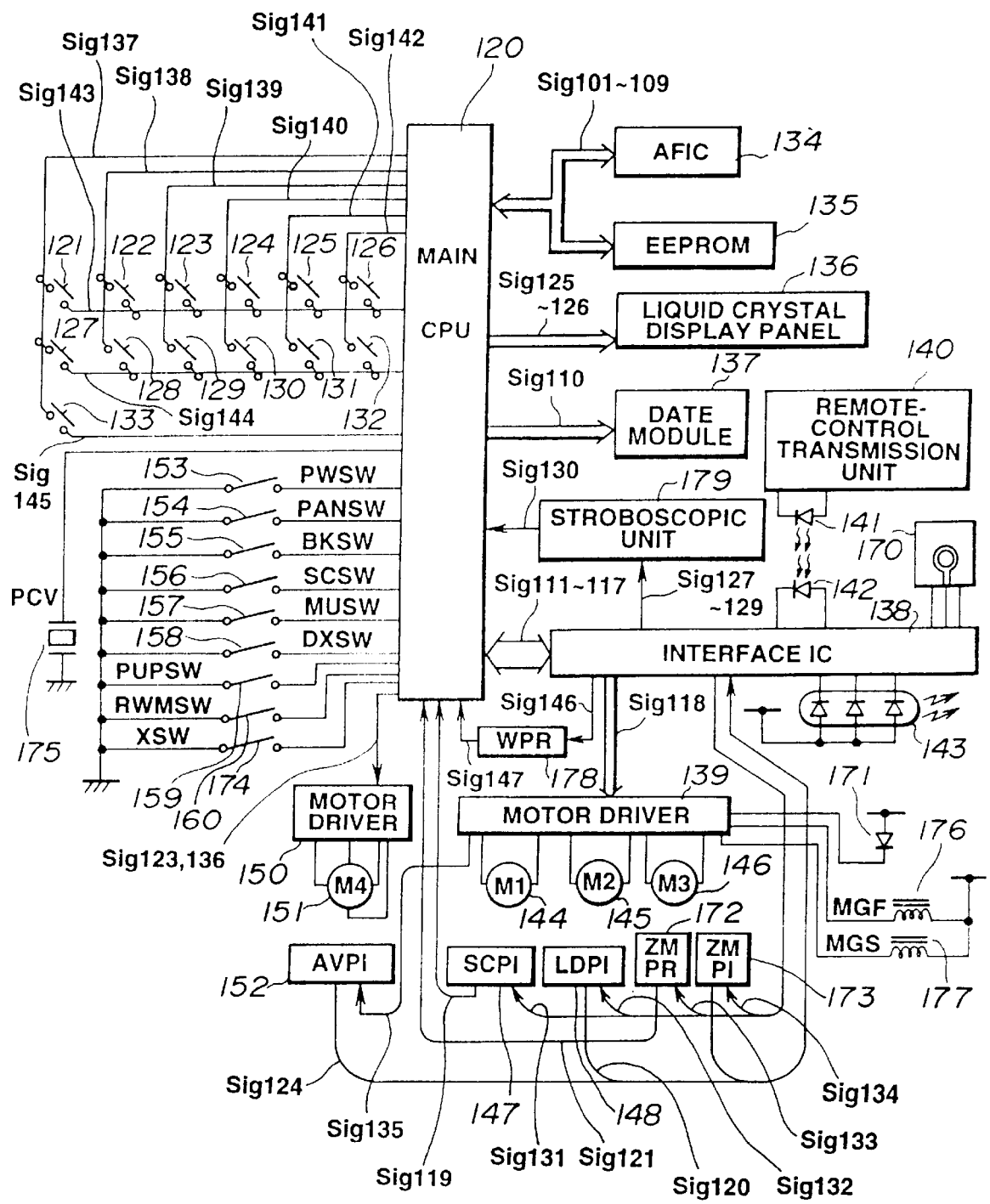
FIG. 1 is a block diagram of an electric circuit, showing a principal electric circuit section in a camera to which a power transmission mechanism according to a first embodiment of the invention is applied.

FIG. 1 is an electric-circuit block diagram showing a principal electric circuit in a camera to which a power transmission mechanism according to a first embodiment of the invention is applied. The camera is a camera having a single-lens reflex arrangement in which a body section and a lens section are integrally formed, and has function of zoom, auto focus or the like.

A sequence motor for controlling the whole on the side of a body, three motors M2~M4 in addition to a motor M1 (144), and magnets 176 and 177 for controlling a focal plane shutter are included as main or principal actuators.

Here, the camera has multiple functions by the fact that the invention is utilized for the sequence motor M1 to take charge of driving three kinds of driving systems, while the camera is capable of performing respective controlling of and controlling by four motors.

A principle of a clutch mechanism which transmits, in changing-over, a power from the sequence motor to predetermined various mechanisms will be described with reference to FIGS. 2 and 3, prior to the fact that a detecting method in the power transmission apparatus according to the embodiment is described in detail.

Figure 2:
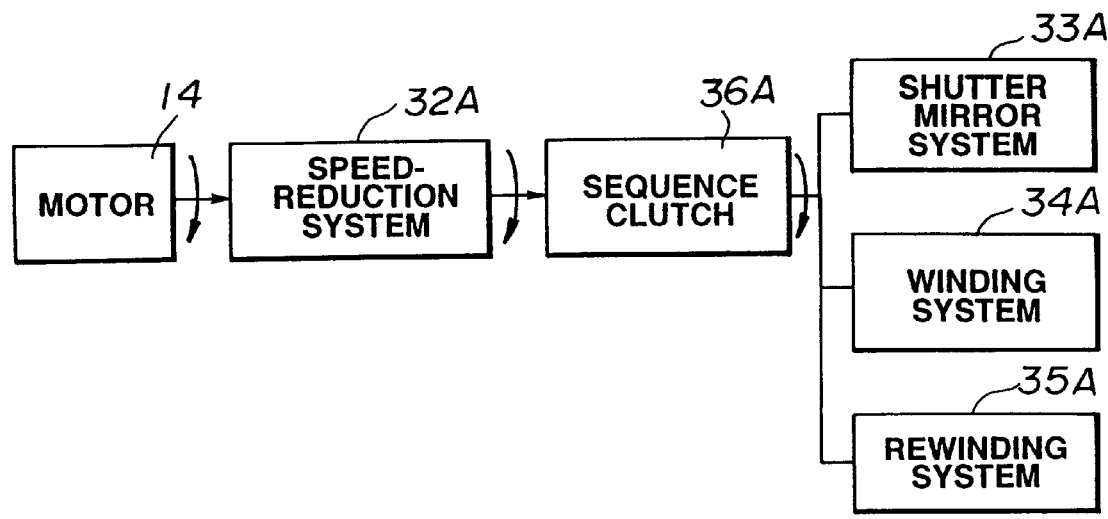
FIG. 2 is a block diagram showing power distribution within a power unit in the embodiment.

FIG. 2 is a block diagram showing power distribution within a power unit of the clutch mechanism in the embodiment.

As a power source for the camera, a large-sized motor having such power as to be capable of driving various driving systems directly from a motor cannot be used from the point of view miniaturizing or down-sizing the whole of the camera for a motor 14 used in the present embodiment. Accordingly, a speed reduction system 32A is arranged from the motor 14, and motor power is transmitted to a sequence clutch 36A that is a chief or main mechanism of the present embodiment after the motor power has been decelerated in speed to a certain degree.

The present embodiment is arranged such that power can be switched or changed over to three (3) systems by the sequence clutch 36A. The three (3) systems include a shutter•mirror system 33A, a winding system 34A and a rewinding system 35A. The sequence clutch 36A transmits power to these three (3) systems in an alternative way. The arrangement is such that driving force from the motor 14 is not at all transmitted to the other two (2) systems during driving.

A principle of the sequence clutch 36A will next be described by the use of a conceptional view in FIG. 3.

Figure 3:
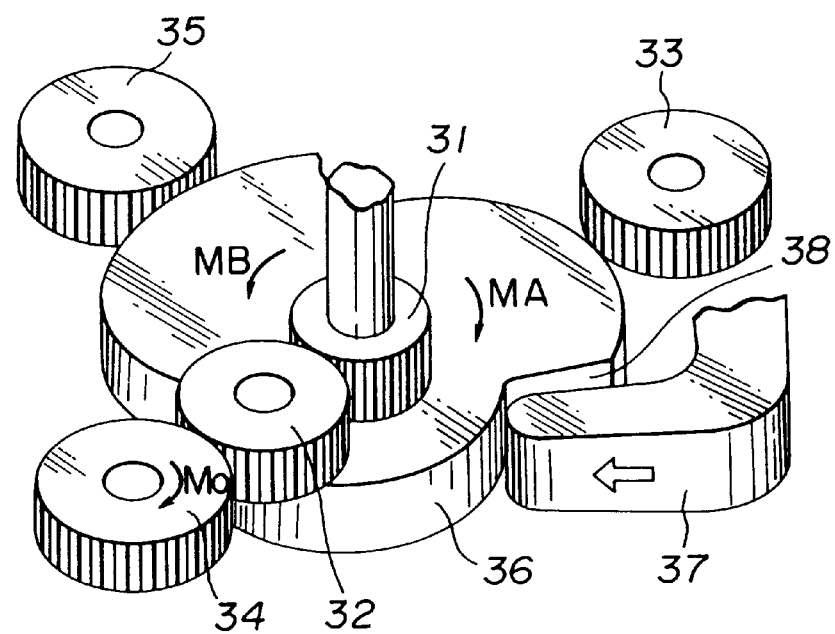
FIG. 3 is a perspective view showing a principle of a sequence clutch employed in the first embodiment.

FIG. 3 is a perspective view showing a sequence clutch of the clutch mechanism in the embodiment.

The sequence clutch 36A (refer to FIG. 2) utilizes a so-called planetary gear. More specifically, the sequence clutch 36A uses a planetary gear of rotary type capable of angularly moving through 360°. The sequence clutch 36A has driving systems equal to or greater than at least three (3) systems within the range of the angular movement. Main or primary arranging gears are a sun gear 31 which receives driving force from the motor so as to revolve about its own axis, a planetary gear 32 capable of revolving with respect to the sun gear 31 and initial-stage gears 33, 34 and 35 of the respective driving systems.

The sun gear 31 is arranged such that power from the motor 14 is transmitted through the speed-reduction system 32A (refer to FIG. 2). The sun gear 31 is angularly movable in both directions (MA and MB in FIG. 3) by a rotational direction of the motor 14.

The planetary gear 32 is pivoted on an upper surface of a clutch cam 36. The planetary gear 32 has some load (hereinafter referred to as "friction") with respect to the clutch cam 36 and is angularly movable. The clutch cam 36 is pivoted on an axis which is the same as the sun gear 31 by an element (not shown). The clutch cam alone is rotatable under no load.

The planetary gear 32 is so arranged as to be pivoted on the upper surface of the clutch cam 36 on one side in keeping with friction. However, the planetary gear 32 is arranged such that a distance between an axis of a rotational center of the planetary gear 32 and an axis of a rotational center of the sun gear 31 (hereinafter referred to as "distance between axes") becomes a dimension which secures backlash and which is adequate for the so-called gear for transmitting the power.

That is, the arrangement is such that, since the friction is applied to the planetary gear 32, the clutch cam 36 receives force from the planetary gear 32 when the sun gear 31 is angularly moved so as to be biased to be revolved in the angular moving direction of the sun gear 31.

By the way, an object of the sequence clutch 36A is to change over the power to at least three systems. Accordingly, the sequence clutch 36A cannot perform its role only if the clutch cam 36 is always revolved.

The embodiment is arranged such that engaging surfaces 38 of a number corresponding to a number of changing-over power systems are provided on the clutch cam 36, and the engaging surfaces 38 are engaged by the clutch lever 37 which is spring biased toward a central direction of the clutch cam 36, whereby rotation of the clutch cam 36 in one direction is regulated at a specific or control position.

In FIG. 3, the arrangement is such that, when the rotational direction of the clutch cam 36 is indicated by the arrow MA, the clutch cam 36 is stopped by a clutch lever 37, while, when the rotational direction of the clutch cam is indicated by the arrow MB, the clutch cam 36 continues to be revolved while the clutch cam 36 lifts the clutch lever 37.

That is, in FIG. 3, upon rotation in the MB direction, if it is considered that operation starts from an engaging state illustrated in FIG. 3, the clutch lever 37 is lifted together with rotation of the clutch cam 36, since such a cam surface as to gradually lift the clutch lever 37 against the spring biasing force is formed on an end of the engaging surface 38. When the clutch lever 37 is rotated through a predetermined quantity (here, since changing-over is performed to the three systems, the predetermined quantity is about 120°), the clutch lever 37 falls in the subsequent engaging surface 38, and a relative position of the clutch lever 37 becomes equal or equivalent to that illustrated in FIG. 3.

That is, the clutch lever 37 performs the above-described lifting operation three (3) times during the time that the clutch cam 36 is through one revolution. Moreover, it is needless to say that, in a case where the rotational direction is changed over from the MB direction to the MA direction, the clutch cam 36 is revolved in the MA direction and holds the engaging surface 38 which is first abutted against the clutch lever 37, so that revolution is inhibited.

Well, the foregoing is readjusted. It can be said that the sequence clutch 36A (refer to FIG. 2) is characterized in that the clutch is continuously changed over by the rotation of the motor in one direction, while the power is transmitted to the selected driving system by the rotation of the motor in the other direction.

Returning to FIG. 3, initial stage gears of the respective driving systems are arranged around the clutch cam 36. The state of FIG. 3 is a state which drives the winding system 34A (refer to FIG. 2). However, the arrangement is such that rotation of the sun gear 31 in the MA direction rotates the initial stage gear 34 of the winding system 34A in the MC direction indicated by the arrow to transmit the power to a spool (not shown).

The position of the planetary gear 32 is controlled or adjusted by the engaging surface 38. However, under the power transmission state, rotational centers of respective gears including the sun gear 31, the planetary gear 32 and the initial stage gear 34 of the winding system are arranged along a straight line.

Furthermore, adequate backlash is secured under this state between the planetary gear 32 and the initial-stage gear 34.

If the other engaging surface 38 is engaged by the clutch lever 37, the planetary gear 32 is in mesh with the initial-stage gear 35 of the rewinding system 35A, or with the initial-gear 33 of the shutter-mirror system 33A, (refer to FIG. 2).

The relative relationship between each gear and the engaging surface 38 is formed such that, also under this state, the rotational centers of the respective sun gear 31, planetary gear 32 and initial-stage gear 35 or the rotational centers of the respective sun gear 31, planetary gear 32 and initial-stage gear 33 are arranged along a straight line. That is, when the clutch cam 36 is rotated in the MB direction in FIG. 3, the planetary gear 32 revolves while passing through a meshing position upon transmission of the driving systems.

A method of detecting a clutch section used in the present embodiment will next be described with reference to FIGS. 4 to 9.

As described previously, since the clutch section is formed by the plurality of cams, the engaging surface, the relationship between the clutch lever for causing the clutch section to be engaged and the clutch cam present a problem. That is, it is necessary to judge, at any moment, to what driving system the power is transmitted if at what timing switching or changing-over is made to the motor rotating direction on the driving side from the motor rotation in the clutch changing-over direction. For this reason, in the present embodiment, detection of the position of the clutch cam is made possible by the following system.

Figure 9:
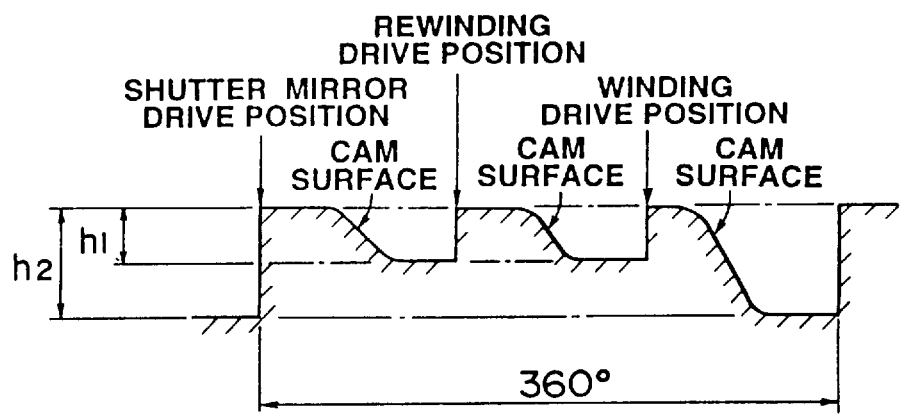
FIG. 9 is a development view in which a circumference of the clutch cam in the embodiment, including a cam surface is developed.

FIG. 9 is a development view showing the clutch cam. In the cam, quantities $h_2$ and $h_1$ of lift are different from each other in the engaging surface at the shutter•mirror driving position and the winding and rewinding engaging surface. That is, a state in which the shutter•mirror driving position can be engaged is the duration from the moment at which lowering is made from the top dead center position through the quantity of lift $h_2$ to the moment at which getting over occurs, the subsequent top dead center position and subsequent lowering, when the clutch cam is rotated in the changing-over direction. Accordingly, since there is only one of lowering by the distance $h_2$ during the time that the clutch cam is rotated through one revolution, grasping of the absolute position is made possible by the fact that, at this location, the state of the cam surface or the lever is detected. In the present embodiment, a system in which detection of the absolute position is performed by a system in which the position of the clutch lever abuts against the cam is detected will hereunder be described in detail.

Figure 4:
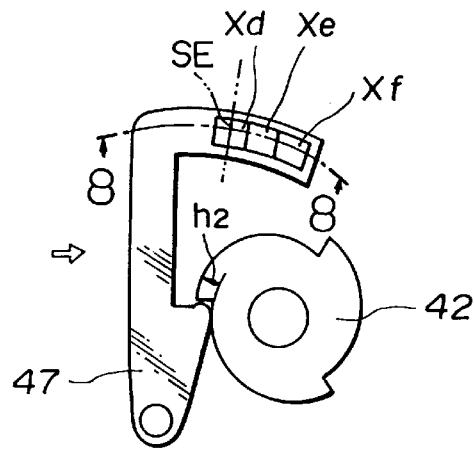
FIG. 4 is an explanatory view showing the relationship between a clutch cam and a clutch lever in the first embodiment.

FIG. 4 shows the relationship between the clutch cam and the clutch lever, in which the lever is spring-biased in a direction indicated by an arrow.

A point different from the conceptional view described with reference to FIG. 3 or the like is a point in which the detecting section (upper side in FIG. 4) is formed integrally. A sensor monitoring point (SE point) indicated by an arrow is the only detecting point of a photoelectric sensor in the present clutch. In the present embodiment, the sensor monitoring point is a location capable of detecting a state of a clutch lever 47 by a photo-interrupter (hereunder referred to as "SCPI").

Figure 8:
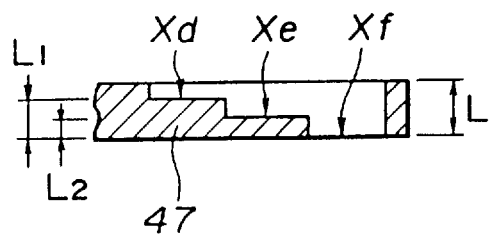
FIG. 8 is a cross-sectional view showing the clutch lever, taken along a line 8—8 in FIG. 4.

Well, FIG. 4 shows a state in which the shutter•mirror position is now engaged. That is, the clutch lever 47 is located at a position which is lowered through distance $h_2$ from the outermost periphery of a clutch cam 42. An $X_d$ portion within the clutch lever 47 corresponds to the SE point. However, here, a cross section 8—8, of FIG. 4 is shown in FIG. 8 in order to clearly describe $X_d$.

The wall thickness of the detecting section is L. However, the wall thickness of the $X_d$ portion corresponding to the SE point is now $L_1$. In FIG. 4, as will be clear from the fact that the clutch lever 47 is lifted by the clutch cam 42, the detecting surface corresponding to the SE point is moved to $X_e$ and $X_f$. The $X_e$ portion is formed by the wall thickness $L_2$. An aperture is formed in the $X_f$ portion. There is no element in the $X_f$ portion which screens or shields the photo-interrupter. Here, the clutch lever 47 is a mold element in which the engaging portion and the detecting portion are molded integrally.

Since the photo-interrupter SCPI is an element which receives a projected infrared light, there can be produced different outputs if transmittance of the $X_d$ portion and transmittance of the $X_e$ portion which are different in thickness from each other are different from each other even if it is the clutch lever 47 which is molded integrally. Specifically, in the present embodiment, the $X_d$ portion sets the transmittance approximately to 0 (zero), the $X_e$ portion sets the transmittance approximately to 25%, and the $X_f$ portion sets the transmittance to 100%, because the $X_f$ portion is the aperture. For this reason, the wall thickness of the clutch lever 47 is set to $L_1$: 0.7 mm and $L_2$: 0.2 mm.

Further, the overall width: L is set to 0.8 mm from a clearance of a package of the photo-interrupter SCPI. In this connection, a signal from the SCPI is led to the detecting portion by a flexible substrate (not shown).

By the arrangement shown, the SCPI can always grasp the quantity of lifting of the clutch lever 47 to three states including the maximum, $h_1$-down and $h_2$-down. In this connection, it has been described here that material of the clutch lever is molded. However, it is needless to say that characteristics of a simple substance thereof are a tone which can shield a light substantially perfectly by a plate having approximately 0.7 mm. Moreover, in the present embodiment, material is used whose transparency or transmission is 25% at the wall thickness of 0.2 mm. However, the wall thickness is not particularly limited to this. If the wall thickness is adequately changed as occasion demands, there is no problem in the mechanism.

Well, since a range in which there exists a depth of $h_2$ at only one location in the entire periphery of the cam, it has been described that detection of the absolute position is possible. However, the behavior of the clutch cam 42 and the clutch lever 47 upon changing-over will next be described in detail with reference to FIGS. 4 to 7.

FIG. 4 shows a state under which the shutter•mirror position is engaged, that is, a normal stand-by position. Now, when the actual photographing operation is considered, the present camera drives the driving system in order of winding and shutter charge after completion of exposure.

Accordingly, the clutch portion also performs immediate changing-over after completion of exposure (including up to the mirror down), and power must be transmitted to the winding driving system. After the mirror down movement has been completed under the condition illustrated in FIG. 4, the motor starts reverse rotation. Since what is the reverse rotation here means angular movement in the clutch changing-over direction, the clutch cam 42 comes off the engaging surface, and is moved angularly in a right-hand, i.e. clockwise, rotation in the figure.

Figure 5:
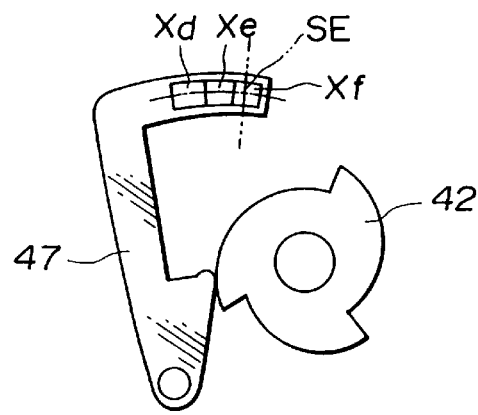
FIG. 5 is an explanatory view showing the relationship between the clutch cam and the clutch lever in the first embodiment.

This is a state illustrated in FIG. 5, and the clutch lever is lifted against the spring biasing force. A state in which the lifting is completed, and the angular movement advances to the top dead center of the cam is the moment illustrated in FIG. 5. The $X_f$ portion that is the aperture portion corresponds to the sensor surface, that is, the SE point.

Now, it is assumed that an output level of the sensor under this state is High (hereinafter referred to as "H-level"). Furthermore, it is assumed that an output level of a light shielding portion corresponding to FIG. 4 is Low (hereinafter referred to as "L-level"). Further, it is assumed that an output level corresponding to the middle $X_e$ portion is Mid (hereinafter referred to as "M-level"). In this connection, it is considered that an output here does not include a value under a steady state, that is, which is outputted for a moment on the changing-over way, of waveforms which are outputted from the SCPI simple substance. Accordingly, in a case where the clutch lever 47 is moved to, for example, $X_d \rightarrow X_f$ during changing-over, an output of $X_e$ is produced for a moment on the way. However, in the description here, the portion will be omitted for convenience.

Since, after the state in FIG. 5, the motor further continues to be rotated, the cam continues the right-hand rotation. At the time of completion of the top dead center range, lowering by a distance of $h_1$ is performed. Thus, the clutch lever 47 is also moved angularly following the clutch cam 42. The detecting portion corresponding to the SE point becomes the $X_e$ portion. The $X_e$ portion is judged, and the motor stops. That is, the winding system is driven by angular movement of the motor in the driving direction of the mechanism. However, it is ensured by the judgment of the $X_e$ portion.

Figure 6:
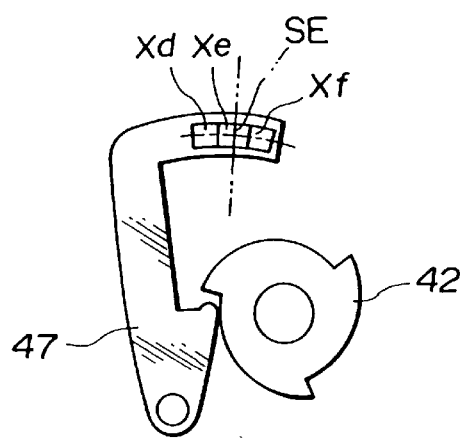
FIG. 6 is an explanatory view showing the relationship between the clutch cam and the clutch lever in the first embodiment.

FIG. 6 shows a state at the moment the motor stops.

Figure 7:
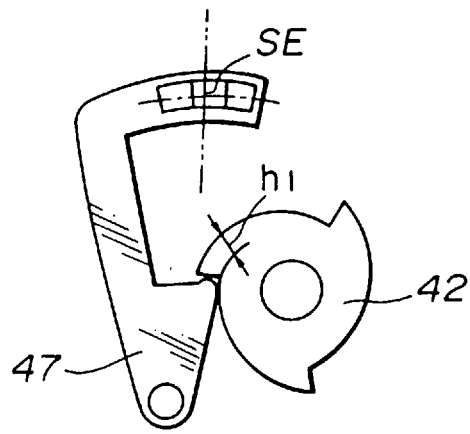
FIG. 7 is an explanatory view showing the relationship between the clutch cam and the clutch lever in the first embodiment.

Since the motor which is braked by the M-level judgment is slightly overrun, the engaging surface of the clutch cam 42 is not abutted against the clutch lever 47 under this state. In the present camera, since the exposure~winding are a series of operations, the state illustrated in FIG. 6 is a moment, and the motor is changed over to rotation in the driving direction. FIG. 7 shows the state in which the clutch cam 42 is engaged, and the winding system is driven.

The changing-over from the shutter•mirror system to the winding system has been described above. Here, judgment of the M-level has been performed in order to detect the $X_e$ portion. However, as the characteristics of the present invention, since the scope or range in which the outputs of the M-level are produced exists at two locations, detection of the absolute position cannot be performed. Accordingly, in fact, it is required that the judgment of the level and the judgment of the count (at what number the M-level is) of the level are performed. In the present camera, it is judged that the initial M-level is the winding portion, while the second M-level is the rewinding portion, with respect to the initial position, whereby two (2) locations equivalent in level to each other are judged. Accordingly, in a case where rewinding is desired to be forcibly performed on the way of photographing, the clutch angularly moved from the initial position (the shutter•mirror position) passes through the winding system, and stops at the second M-level judgment, whereby optional rewinding from any state is made possible.

Here, functions of the respective portions will briefly be described with reference to FIG. 1, prior to the fact that the system of detecting the clutch lever is described.

In FIG. 1, a CPU 120 successively performs a program which is stored in an internal ROM to perform control of the peripheral IC or the like. AFIC 134 is an IC for auto focus. In this connection, in the present camera, the auto focus system employs a TTL phase difference detecting system.

First, a resetting signal of AFIC (AFRES) Sig 101 is sent to the AFIC 134 from the CPU 120, and the AFIC 134 is reset. A light from a subject passes through a photographing lens, and reaches a location on a photosensor array which is arranged on an upper surface of the AFIC 134. Then, processings such as integration of light intensity and quantization are performed within the AFIC 134. The quantity of shear of the point is calculated or computed as distance measurement information.

When the integration of the light intensity has been completed, a signal (AFEND) Sig 102 indicating that the integration of the light intensity has been completed is sent to the CPU 120. The distance measurement information is transmitted to the CPU 120 by a Sig 103, a data signal (DATA) Sig 104 and a clock signal for synchronization (CLK) Sig 104, which indicate that communication is performed between the AFIC 134 and the CPU 120.

By the way, if the characteristics of various elements of the photosensor array have variation, it is impossible to produce exact distance measurement information as it is. In view of this, the variation information of the photosensor array is previously stored in an EEPROM 135 that is a non-volatile storage element. Correction computation of the distance measurement information which is produced from the AFIC 134 is performed by the CPU 120. Various adjustment or regulation values such as mechanical variation, variation of the electric characteristics of the various kinds of respective elements and the like are stored in the EEPROM 135. These adjustment values activate the EEPROM 135 as occasion demands. That is, the adjustment values are made possible to be read out by a signal (EPCEN) Sig 107 which brings a communicable state, data signal (DATA) Sig 108 and a synchronous clock signal (CLK) Sig 109. In this connection, giving and receiving of data among the CPU 120, the AFIC 134 and the EEPROM 135 are performed by serial communication.

A date module 137 performs projection of date to a film by a projecting signal Sig 110 from the CPU 120. Light emitting time of the projecting lamp stepwise varies depending upon an ISO sensitivity of the film. An interface IC (hereinafter referred to as "IFIC") 138 is activated by an IFIC activating signal (IFCENb) Sig 111 from the CPU 120, and uses a latch signal (LATCH) Sig 112, 4-bit bus line signals (D0b~D3b) Sig 113~Sig 116 and a D/Ab signal Sig 117 are used to perform parallel communication with respect to the CPU 120, and measurement of the subject intensity, measurement of temperature within the camera, reshaping of the waveform of an output signal from the photo-interrupter or the like, constant-voltage driving control of the motor, generation of various kinds of constant voltages such as temperature steady voltage, temperature proportional voltage or the like, check of the remaining quantity of a battery, receiving of an infrared remote control, control of a motor driver IC, control of various kinds of LEDs, monitoring of low voltage of power source voltage, control of a pressure rising circuit, and the like are performed.

In connection with the above, the latch signal Sig 112 is a signal for taking timing which reads out a signal on a bus line. A D/Ab signal is a signal which indicates that the 4 bit bus line signals Sig 113~Sig 116 indicate address, or indicate data. When the D/Ab signal is "H", the 4 bit bus line signals Sig 113~Sig 116 indicate an address, while, when the D/Ab signal is "L", the 4 bit bus line signals Sig 113~Sig 116 indicate data.

Measurement of subject intensity is performed by the use of a two-divided silicone photodiode 170. A light receiving surface of the sensor is divided into two including a cross-sectional central portion and a peripheral portion thereof, and can perform two photometries including SPOT photometry which performs photometry only by a portion on a center of an image plane, and average photometry in which photometry is performed by the use of the entire image plane. The photometry sensor outputs current in accordance with the subject intensity, to the IFIC 138. At the IFIC 138, an output from the photometry sensor is converted to voltage, and is transmitted to the CPU 120. At the CPU 120, computation of exposure, back-light judgment or the like is performed on the basis of the voltage information.

Measurement of temperature within the camera is such that voltage in proportion to the absolute temperature is outputted by a circuit which is built in the IFIC 138, and a signal thereof is A/D-converted by the CPU 120, to thereby obtain a value. The obtained temperature measurement value is used for correction or the like of a mechanical element and an electric signal in which a state varies depending upon temperature. Reshaping of a waveform from the photo-interrupter is such that photoelectric current that is an output from the photo-interrupter, photo-reflector or the like is compared with reference current, and is outputted from the IFIC 138 as a rectangular wave. At this time, hysteresis is caused to be had to the reference current, whereby noise removal is performed. Further, by communication to the CPU 120, it is possible to vary or change the reference current and the hysteresis characteristic.

Check of the remaining quantity of the battery is such that a low resistor is connected to both ends of the battery, voltage at both ends of the battery at the time current is caused to flow is partially divided within the IFIC 138 and is outputted to the CPU 120, and the A/D conversion is performed at the CPU 120 to produce a voltage value. Receiving of infrared-light remote-control is such that a modulated infrared light is emitted from a light projecting LED 141 of a remote-control transmitting unit 140, and the infrared light is received by a light-receiving silicon photo-diode 142. Processing such as reshaping of the waveform or the like is performed within the IFIC 138 with respect to an output from the silicone photodiode 142, and the output is transmitted to the CPU 120.

Monitoring of the low voltage of the power source voltage is such that an exclusive terminal is provided on the IFIC, and when voltage inputted thereto is less than a specified or established value, a resetting signal is outputted from the IFIC 138 to the CPU 120, to prevent running-away or the like of the CPU 120. Control of a pressure rising circuit is which that the pressure rising circuit is operated when the power source voltage is lowered to a value lower than a predetermined value. Moreover, an LED 143 for display within a finder, such as completion of AF distance measurement, warning of stroboscopic light emission or the like, or an LED which is used for the photo-interrupter or the like is connected to the IFIC 138.

Turning-on and -off of the LEDs and control of the light intensity of the light emission are such that communication is made between the CPU 120, and the EEPROM 135 and the IFIC 138, and the turning-on and -off of the LED's and the control are directly controlled by the IFIC 138. Controlled are turning-on and -off of an LED current Sig 131 of the SCPI 147, an LED current Sig 132 of the LDPI 148, an LED current Sig 133 of the ZMPR 172, an LED current Sig 134 of a ZMPI 173, an LED current Sig 135 of an AVPI 152, an LED current Sig 146 of a WPR 178 and the LED 143 for display within the finder.

In the constant-voltage driving control of the motor, it is possible to stepwise set the driving voltage by communication with the CPU 120. A motor driver IC 139 performs film feeding, charge of the shutter, and mirror driving. The motor driver IC 139 performs driving of three motors including a motor 144 corresponding to the motor 14 in FIG. 2 (hereinafter referred to as "sequence motor" in order to distinguish the other motors), an LD motor 145 for driving the lens for focus adjustment, and a ZM motor 146 for zooming a mirror frame, driving of the pressure rising circuit, driving of an LED 171 for display of operation of the self-timer, control of a first-blind magnet (MGF) 176 for absorbing and holding a first blind of a focal plane shutter, a second-blind magnet (MGS) 177 for absorbing and holding a second or last blind of the focal plane shutter and the like are performed.

The control of these operations, for example, what device is driven, what motor is normally rotated or reversely rotated, what braking is applied, or the like is controlled by a signal Sig 118 in which the signal from the CPU 120 is received by the IFIC 138, and the IFIC 138 turns on and off the various transistors of the motor driver 139. It is detected by an SCPI 147 that is the photo-interrupter for detection under what states such as shutter charge, film winding, and film rewinding the sequence motor 144 is. A signal Sig 119 thereof is outputted to the CPU 120.

The quantity of feeding of the lens is detected by a photo-interrupter LDPI 148 which is mounted on the LD motor 145. An output Sig 120 thereof is sent to the CPU 120 after being reshaped in waveform by the IFIC 138. The state of zooming of the mirror frame is detected by the photo-interrupter ZMPI 173 and a photo-reflector ZMPR 172 which are built in the mirror frame. The arrangement is such that, when the mirror frame is between TELE and WIDE, a high reflecting portion which is provided on the mirror frame is so arranged as to be opposed against the ZMPR 172, and is such that a non-reflecting portion is opposed against the ZMPR within a range other than that.

Thus, detection of the TELE end and the WIDE end is made possible, by the fact that an output Sig 121 of the ZMPR 172 is inputted to the CPU 120. The ZMPI 173 is mounted on the ZM motor 146, and an output Sig 122 thereof is reshaped in waveform by the IFIC 138 and, subsequently, is inputted to the CPU 120, to thereby detect the quantity of zooming from the TELE end or the WIDE end.

A motor driving IC 150 is so arranged such that a stepping motor for driving a stop adjusting unit and an AV motor are driven by on- and off-signals (ENA) Sig 136 from the CPU 120, and normal-rotational and reverse-rotational signals (IN) Sig 123. The AVPI 152 is arranged such that its output Sig 124 is reshaped in waveform by the IFIC 138 and is inputted to the CPU 120, to perform detection of the stop opening position.

A liquid crystal display panel 136 is so arranged as to display the number of frames of the film, the photographing mode, the stroboscopic mode, the stop value, the remaining quantity of a cell, and the like by a segment signal (SEG) Sig 125 and a common signal (COM) Sig 126 which are sent from the CPU 120.

A stroboscopic unit 179 is one for emitting light from an arc tube when the intensity of a subject is insufficient upon photographing or upon auto focus measurement of a distance, to give required intensity to the subject. The stroboscopic unit 179 is so arranged as to be controlled by various signals including a stroboscopic charge signal (STCHG) Sig 127 of the IFIC 138, a stroboscopic light-emission start signal (STON) Sig 128 and a signal Sig 129 for stopping the stroboscopic light emission by means of a signal from the CPU 120. Moreover, the stroboscopic charge voltage is so arranged as to be sent to the CPU 120 as a VST signal Sig 130.

The WPR 178 is a photo-reflector for detecting the quantity of feeding of the film. The WPR 178 is arranged so as to be opposed to perforations in the film. Reflectance and reflectance or reflection factors of a light are different in the film surface and the portions of the perforations from each other. Accordingly, outputs from the WPR 178 are different from each other upon correspondence respectively thereto. Upon feeding of the film, since the WPR 178 is arranged such that the film surface and the perforations are opposed against each other alternatively, an output Sig 147 from the WPR 178 becomes the form of a pulse. Counting of the number thereof makes it possible to detect the quantity of movement of the film through one frame.

Key signals 0~5 (KEY 0~KEY 5) Sig 137~Sig 142 and key commons 0~2 (KEYCOM0~2) Sig 143~Sig 145 are used to detect what switch of a switch 121~a switch 133 is turned on.

The KEY 0~KEY 5 are normally pulled up within the CPU 120. Accordingly, the signal level is under the "H"-state. Here, it is assumed, for example, that the KEYCOM0 Sig 143 is "L", the KEYCOM1 Sig 144 is "H", and the KEYCOM2 Sig 145 is "H". At this time, if the R1SW 121 is turned on, the KEY0 Sig 137 is changed from "H" to "L". Accordingly, if the signal levels of the KEYCOM 0~2 Sig 143~Sig 145 and the signal level of the KEY 0~5 Sig 137~Sig 142 are known, it can be known which of the switch 121~switch 133 is turned on. In this connection, it is impossible to simultaneously bring at least two of the KEYCOM 0~2 Sig 143~Sig 145 to "L".

The first release switch (R1SW) 121 is turned on upon a state in which a release button is half depressed, to perform a distance measurement operation. The second release switch (R2SW) 122 is turned on upon a state in which the release button is fully depressed, so that a photographing operation is performed on the basis of various kinds of measurement values. The zoom-up switch (ZUSW) 123 and the zoom-down switch (ZDSW) 124 are switches which perform zooming of the zoom lens. When the ZUSW 123 is turned on, the zoom-up switch (ZUSW) 123 and the zoom-down switch (ZDSW) 124 perform zooming to a long focal-point direction, while, when the ZDSW 124 is turned on, the zoom-up switch (ZUSW) 123 and the zoom-down switch (ZDSW) 124 perform zooming in a short focal-point direction.

When the self-switch (SELFSW) 125 is turned on, a state becomes a self-timer photographing mode or a waiting state of remote control. Under this state, if the R2SW 122 is turned on, the self-timer photographing is performed. If photographing operation is performed by a remote-control transmitter, photographing is performed by the remote control. When the spot switch (SPOTSW) 126 is turned on, a mode becomes a spot photometry mode in which photometry is performed only on a central portion of a photographing image plane. In this connection, normal photometry at the time the SPOTSW 126 is turned off is performed by the use of the entire photographing image plane.

The pict 1 switch (PCT1SW) 127~the pict 4 switch (PCT4SW) 130, and the program switch (PSW) 131 are such that a photographer performs mode selection by a changing-over switch of the program photographing mode in accordance with a photographing state. When the PCT1SW 127 is turned on, a mode becomes a portrait mode in which stop or restriction is made such that a subject depth is shallowed or reduced within an adequate exposure range, and shutter speed is decided or determined. When the PCT2SW 128 is turned on, a mode becomes a night-view mode in which setting is made to a value less than the adequate exposure value upon normal photographing. When the PCT3SW 129 is turned on, a mode becomes a landscape or scene mode in which stop or restriction is made such that the subject depth is deep as far as possible within the adequate exposure range, and a value of the shutter speed is decided or determined.

When the PCT4SW 130 is turned on, a mode becomes a stop motion mode in which the shutter speed is so set as to be fast as far as possible. Further, at this time, it is impossible to use a red-eye prevention mode of a stroboscopic mode.

It is impossible to simultaneously select more than two switches including the PCT1SW 127~PCT4SW 130 as described above.

The PSW 131 is a normal switch for a program photographing mode. By the fact that the PSW 131 is depressed, resetting of the PCT1SW 127~PCT4SW 130 and resetting of an AV priority program mode to be described subsequently are performed.

When the AV priority switch (AVSW) 133 is turned on, the photographing mode becomes a stop priority program mode. The mode is such that an AV value is decided by a photographer, and shutter speed is determined by a program in accordance with the AV value. When in this mode, the above-described functions of the PCT2SW 128 and the PCT4SW 130 are run out so that the PCT2SW 128 and the PCT4SW 130 become switches for setting the AV value. The PCT2SW 128 is a switch for increasing the AV value, and the PCT4SW 130 is a switch for decreasing or reducing the AV value.

The stroboscopic switch (STSW) 132 is a switch for changing over light emission modes of a stroboscope, which changes over a normal automatic light emitting mode (AUTO), a red-eye reduction automatic light emission mode (AUTO-S), a forced light emission mode (FILL-IN), and a stroboscope-off mode.

A power switch (PWSW) 153 is a main switch for the present camera.

A panorama switch (PANSW) 154 is a switch for detecting whether the photographing state is a panoramic photographing or the normal photographing state, which is turned on upon the panoramic photographing.

A back-cover switch (BKSW) 155 is a switch for detecting a state of the back cover, which is turned off under such a state that the back cover is closed. When a state shifts such that the BKSW 155 is changed from turning-on to turning-off, loading of a film starts.

A shutter charge switch (SCSW) 156 is a switch for detecting shutter charge.

A mirror-up switch (MUSW) 157 is a switch for detecting mirror up, which is turned on upon the mirror-up.

A DX switch (DXSW) 158 is a switch for reading DX codes indicating film sensitivity which is printed on a patrone of the film, and for detecting presence and absence of film loading. Although not shown, the DX switch (DXSW) 158 is formed by five switch groups.

A pop-up switch (PUPSW) 159 is a switch for controlling the stroboscope. The PUPSW 159 interlocks with movement of the stroboscopic light emitting portion, and is brought to a turning-on state under a condition that the light emitting portion rises, to perform stroboscopic charge. Further, if the PUPSW 159 is turned on when a subject is low intensity and a stroboscopic mode is Auto, the PUPSW 159 allows the stroboscopic light emission.

A rewinding switch (RWMSW) 160 is a switch for performing forced rewinding of the film. When the RWMSW 160 is turned on, the film is forcedly rewound.

The XSW 174 is a switch for taking timing of the stroboscopic light emission. At the time the first blind of the shutter completes running, the XSW 174 is turned on, while, upon completion of the shutter charge, the XSW 174 is turned off.

A piezoelectric buzzer (PCV) 175 emits sound upon in-focusing at the time of the auto focus, and upon operation of the switch.

A detecting principle of the clutch lever portion will next be described.

Figure 10:
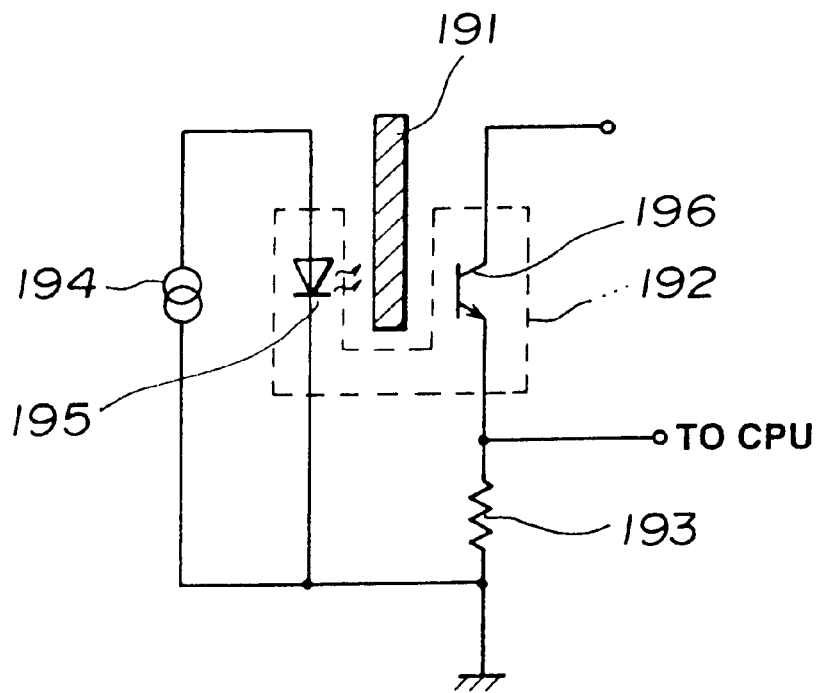
FIG. 10 is an electric circuit view showing an arrangement of an electric circuit of a position detecting mechanism in the camera to which the embodiment is applied.

FIG. 10 is an electric circuit view showing an arrangement of an electric circuit of a position detecting mechanism in the camera.

In FIG. 10, the reference numeral 191 denotes a clutch lever; 192, a detecting photo-interrupter SCPI; 194, a source of current for use as changing over current which flows to an LED 195 built in the photo-interrupter 192, to vary intensity of the LED 195; and 193, a resistor for changing the photoelectric current of a phototransistor 196 to voltage.

The position detecting method will next be described.

As described in FIGS. 4 to 7, when the motor performs a changing-over operation, the clutch lever 47 moves. At this time, a moving portion of the clutch lever 47 moves in the detecting portion having a concave configuration of the photo-interrupter 192. At this time, the moving portion of the clutch lever 47 is such that the Xd, Xe and Xf portions illustrated in FIG. 8 perform reciprocating movement along a curved path.

Figure 11:
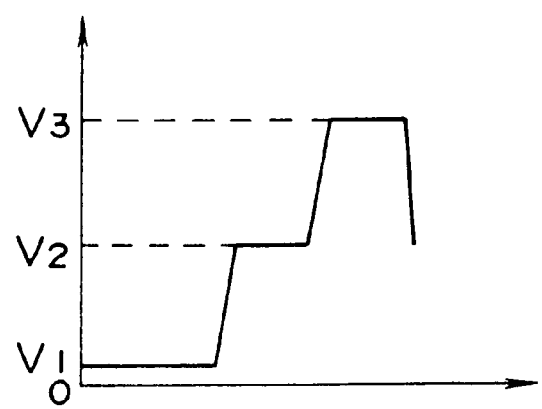
FIG. 11 is a diagrammatic view showing an output signal waveform of a photo-interrupter SCPI in the embodiment.

Since the Xd, Xe and Xf portions of the clutch lever 47 are different in transmissivity from each other, it is possible to produce output signals in accordance with the transmissivity. That is, as shown in FIG. 11, in a case where the photo-interrupter 192 (SCPI) corresponds to a location on the light-shielding portion Xd of the clutch lever 47, a level of the output signal becomes V1.

Furthermore, in a case where the photo-interrupter 192 (SCPI) corresponds to a location on the semi-transparent portion Xe of the clutch lever 47, a level of the output signal becomes V2. Further, in a case where the SCPI corresponds to a location on the fully transparent portion Xf of the clutch lever 47, a level of the output signal becomes V3.

Figure 12:
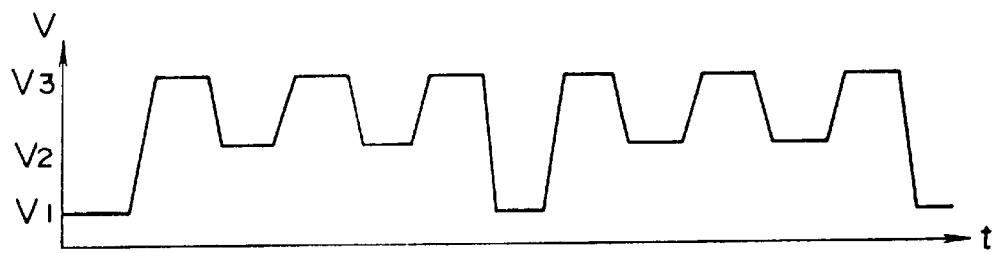
FIG. 12 is a diagrammatic view showing the output signal waveform of the photo-interrupter SCPI in the embodiment.

By the way, in the present embodiment, movement of the clutch lever 47 will be described regarding the fact that to what portion of the clutch lever 47 the photo-interrupter 192 (SCPI) corresponds. Then, the clutch lever 47 moves with Xd→Xf→Xe→Xf→Xe→Xf→Xd serving as a single cycle. Accordingly, an output signal waveform at the time the clutch lever 47 operates becomes a waveform as shown in FIG. 12.

Here, in a case where V1 that is an initial position is detected, a judgment level of the output signal is provided between V1 and V2, while, in a case where V2 is detected, a judgment level of the output signal is provided between V2 and V3. Thus, detection of the initial portion and the other positions is made possible.

However, the fact that a pair of judgment levels are provided within a limited range in 0~V3 makes it difficult to secure a degree of safety or a degree of allowance larger in a case where sufficient hysteresis is required.

Accordingly, in the invention, supply current on the side of the LED of the photo-interrupter (PI) is changed, whereby the output signal from the semi-transparent portion is changed to a level capable of considering equivalent to the light shielding portion or the fully transparent portion. Thus, stable detection is performed.

A principle of the actual current changing-over detection system will hereunder be described.

Figure 13:
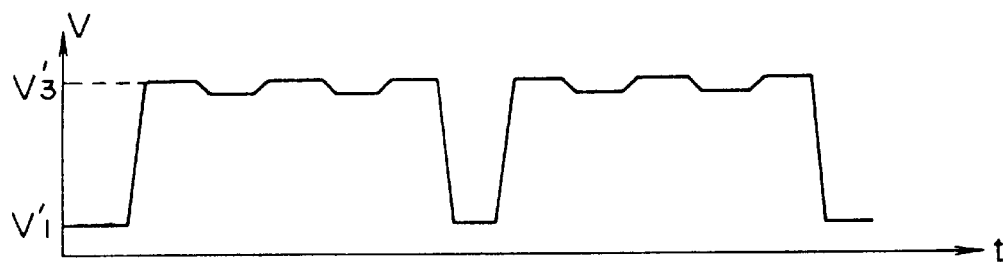
FIG. 13 is a diagrammatic view showing the output signal waveform of the photo-interrupter SCPI in the embodiment.

Here, in a case where initial position detection is performed, if current which passes through the LED 195 is adjusted to an adequate value, there can be produced a waveform of the output signal as shown in FIG. 13. At this time, a portion of last transition from an output level V'3 to V'1 is detected whereby it is detected that the clutch lever 47 is in the initial position.

Figure 14:
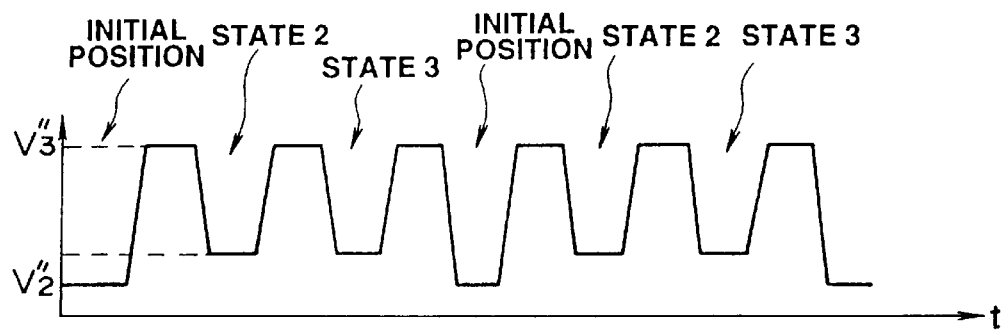
FIG. 14 is a diagrammatic view showing the output signal waveform of the photo-interrupter SCPI in the embodiment.

Subsequently, in a case where a state 2 and a state 3 are detected, adjustment of the LED current is again performed so that there is produced an output signal waveform as shown in FIG. 14. A last transition of the signal waveform from V3" to V2" is counted whereby it is possible to detect a position of the clutch lever.

Figure 15:
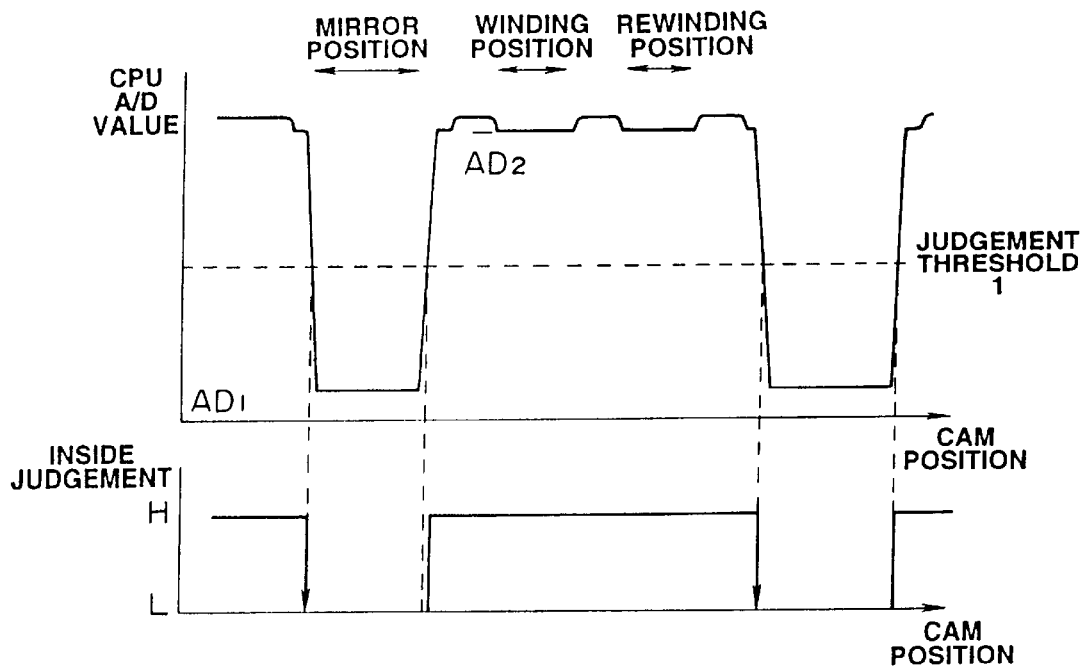
FIG. 15 is a diagrammatic view with the axis of ordinates showing the result in which output voltage from the photo-interrupter SCPI is A/D-converted by a CPU, and with the axis of abscissas showing a rotational position of the sequence clutch, in the camera to which the embodiment is applied.
Figure 16:
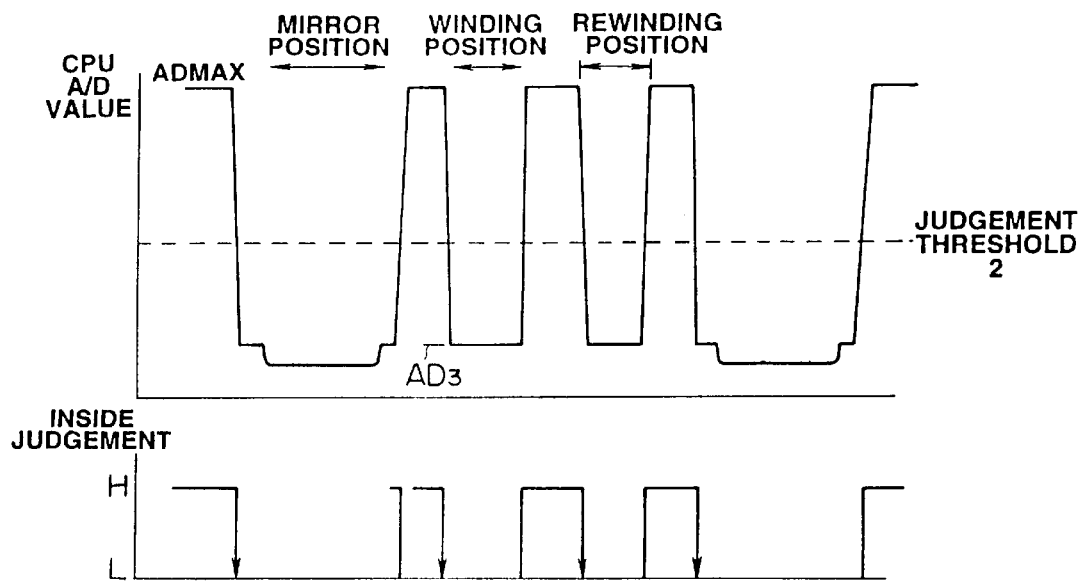
FIG. 16 is a diagrammatic view with the axis of ordinates showing the result in which the output voltage from the photo-interrupter SCPI is A/D-converted by the CPU, and with the axis of abscissas showing the rotational position of the sequence clutch, in the camera to which the embodiment is applied.

FIGS. 15 and 16 will next be described. FIG. 15 is a figure with the result in which A/D conversion is made by the CPU at the time the LED current passing through the SCPI 147 flows through about 10 mA being taken as the axis of ordinate, and with the rotational position of the sequence clutch cam being taken as the axis of abscissa, while FIG. 16 is a figure with the result in which A/D conversion is made by the CPU at the time the LED current passing through the SCPI 147 flows through about 1 mA being taken as the axis of ordinate, and with the rotational position of the sequence clutch cam being taken as the axis of abscissa.

In a case where the sequence clutch is driven to the initial position, that is, a mirror driving system position, the LED current through the SCPI 147 flows through about 10 mA as shown in FIG. 15, and judgment is made on the basis of a threshold level 1 upon detection of the mirror position to detect the last transition. Braking is applied to the motor to stop the motor.

The threshold level 1 in this case is data adjusted. In a case where the sequence clutch is driven to a winding position or a rewinding position, the LED current of the SCPI 147 flows through about 1 mA as shown in FIG. 16. Judgment is made on the basis of a threshold level 2 upon detection of the winding position, to detect last transition. Thus, the sequence clutch is driven to the winding position or the rewinding position on the basis of the number of last transitions from the initial position. The threshold level 2 in this case is data which are adjusted similarly to the initial position.

Figure 18:
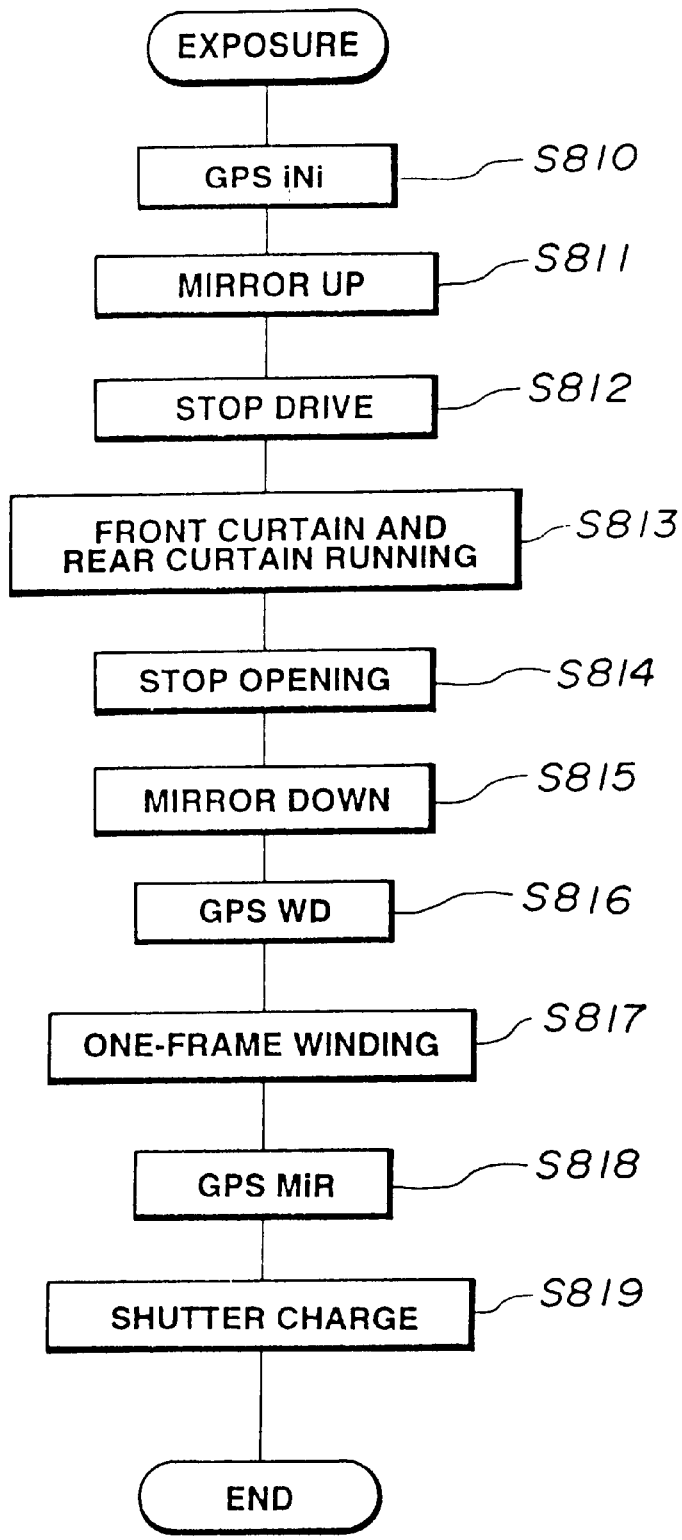
FIG. 18 is a flow chart describing a sequence of exposure in the camera to which the embodiment is applied.
Figure 19:
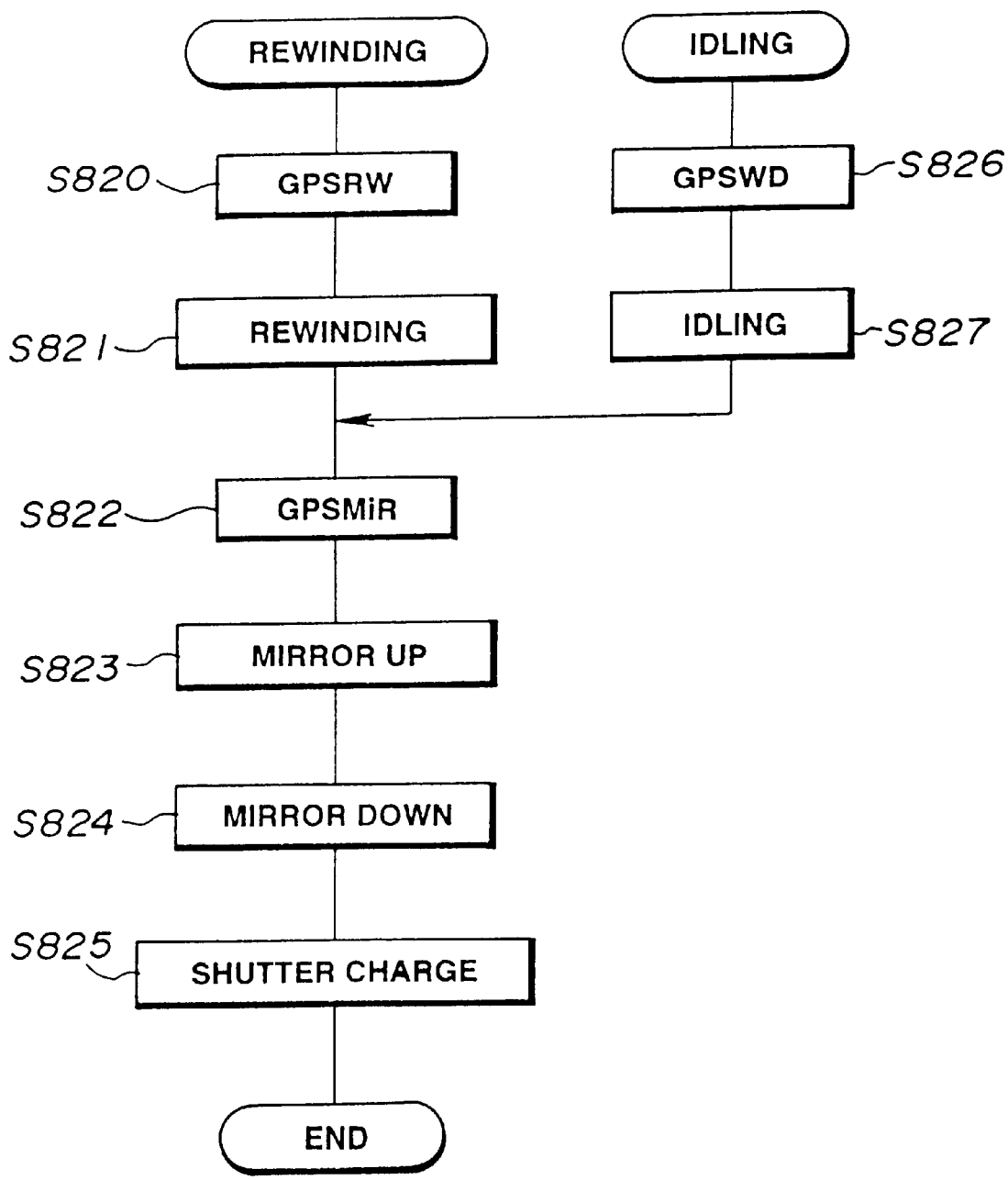
FIG. 19 is a flow chart describing rewinding and idling operations in the camera to which the embodiment is applied.
Figure 20:
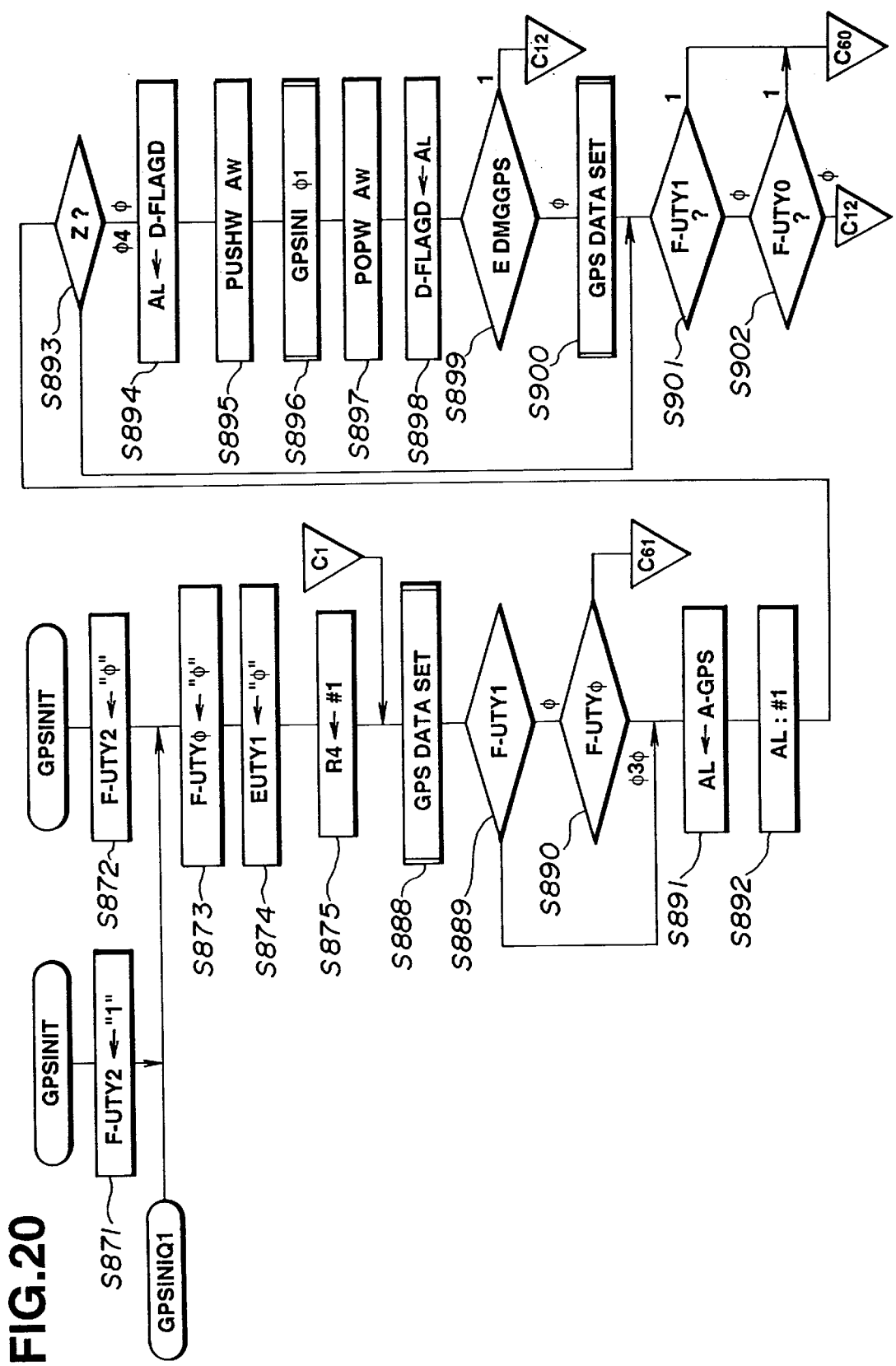
FIG. 20 is a flow chart showing portions of various treatment or processing operations including initial driving of a sequence clutch, driving of the sequence clutch to a position of a mirror driving system, driving to a winding driving-system position and driving to a rewinding driving-system position, in the camera to which the embodiment is applied.
Figure 21:
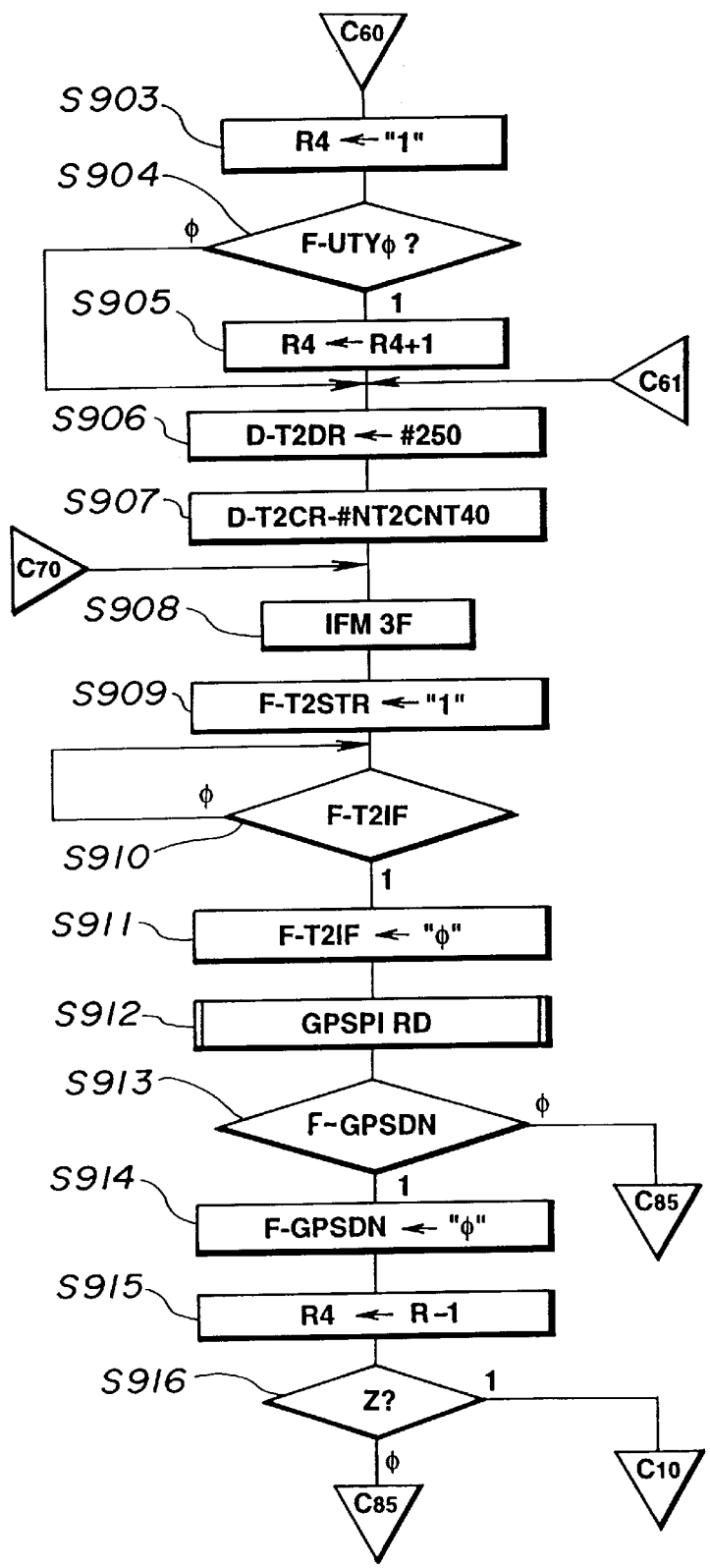
FIG. 21 is a flow chart showing the portions of the various treatment or processing operations including the initial driving of the sequence clutch, the driving of the sequence clutch to the position of the mirror driving system, the driving to the winding driving-system position and the driving to the rewinding driving-system position, in the camera to which the embodiment is applied.
Figure 22:
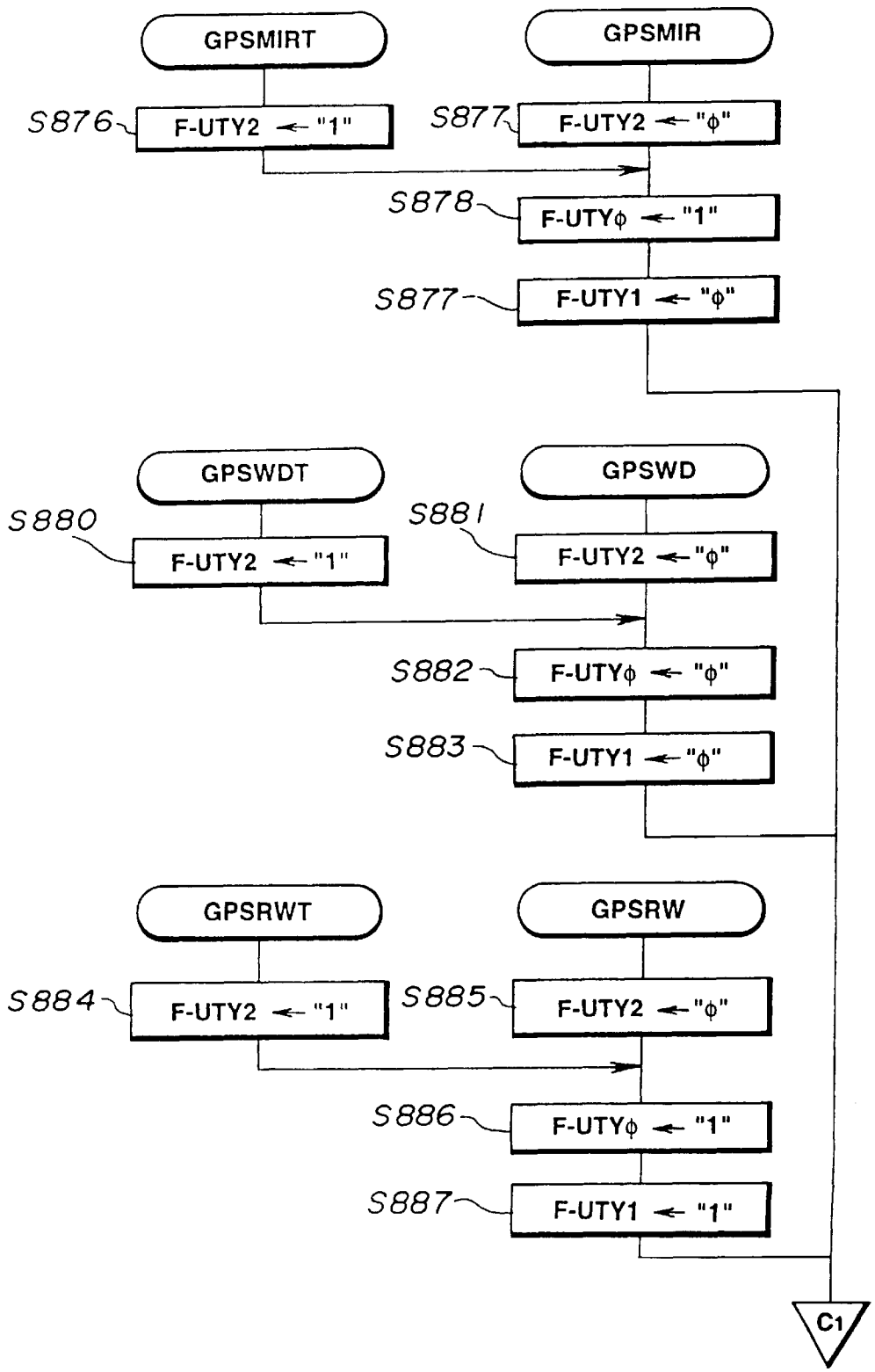
FIG. 22 is a flow chart showing the portions of the various treatment or processing operations including the initial driving of the sequence clutch, the driving of the sequence clutch to the position of the mirror driving system, the driving to the winding driving-system position and the driving to the rewinding driving-system position, in the camera to which the embodiment is applied.
Figure 23:
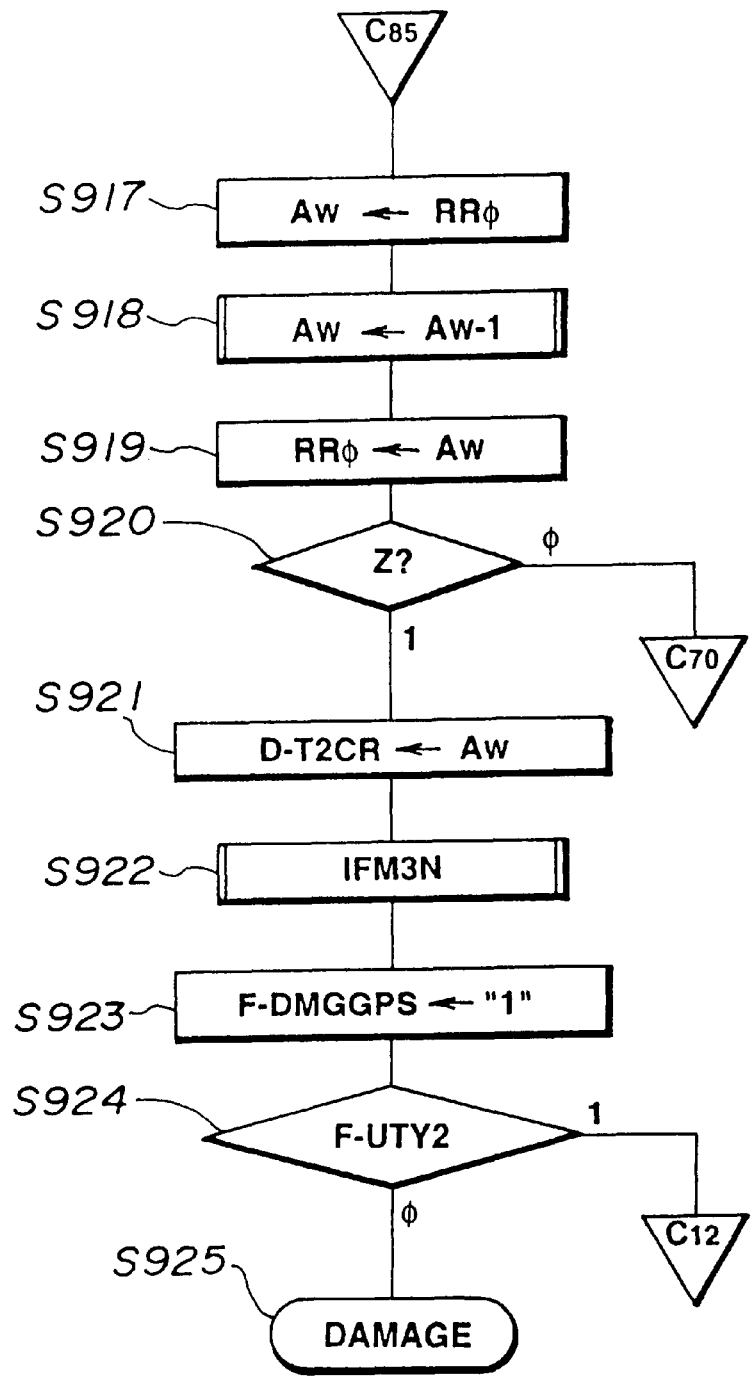
FIG. 23 is a flow chart showing the portions of the various treatment or processing operations including the initial driving of the sequence clutch, the driving of the sequence clutch to the position of the mirror driving system, the driving to a winding driving-system position and the driving to the rewinding driving-system position, in the camera to which the embodiment is applied.
Figure 24:
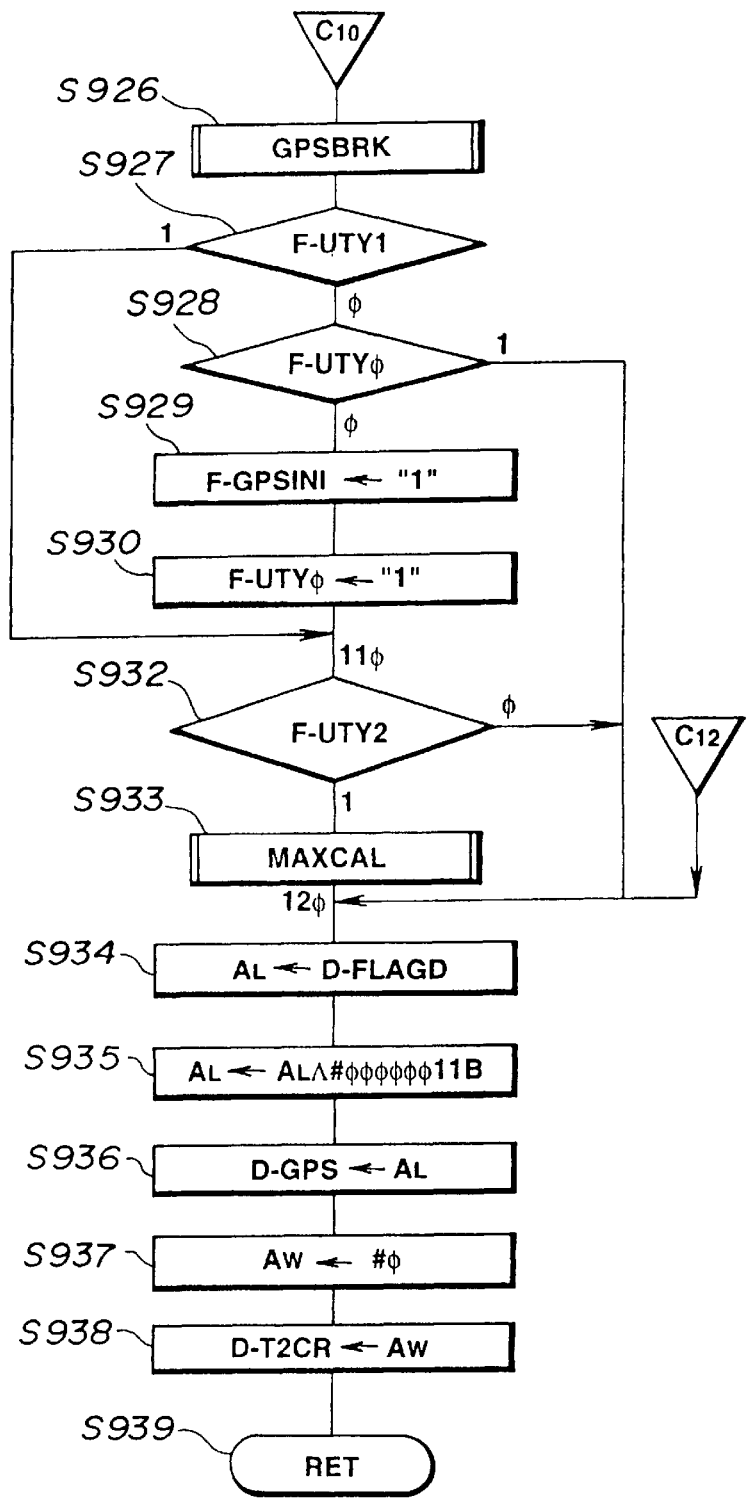
FIG. 24 is a flow chart showing the portions of the various treatment or processing operations including the initial driving of the sequence clutch, the driving of the sequence clutch to the position of the mirror driving system, the driving to the winding driving-system position and the driving to the rewinding driving-system position, in the camera to which the embodiment is applied.

Operation of the camera in the present embodiment which has been described with reference to FIG. 1 will next be described with reference to FIG. 17~FIG. 19.

Figure 17:
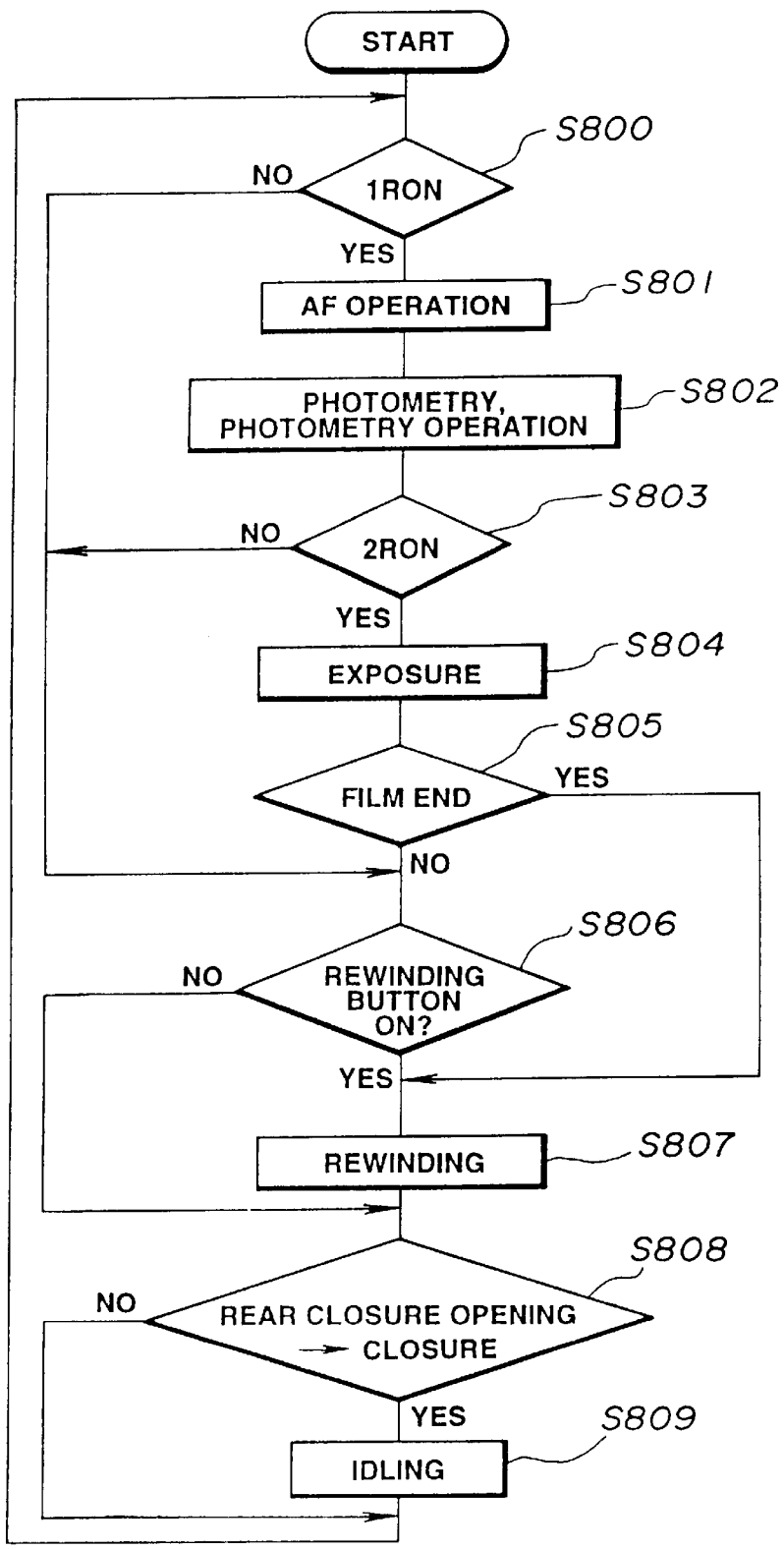
FIG. 17 is a flow chart briefly describing a sequence of the camera to which the embodiment is applied.

FIG. 17 is a flow chart which briefly describes the sequence of the camera. When it is detected that the release button of the camera is half depressed in Step S800, AF operation is performed in Step S801. Photometry is performed in Step S802 to calculate or compute subject intensity, a distance to the subject, film sensitivity, opening of the lens, FNo., and adequate shutter time and the stop value from the focal length.

In Step S803, full depression of the release button is detected. If the full depression is detected, exposure is performed in Step S804. Sequence of exposure will be described with reference to FIG. 18 to be described later.

In Step S805, it is detected whether or not film is at a film end by winding of the film through a single frame after exposure. If the film is at a film end, a signal of the film end is outputted. In Step S805, if the film is at the film end, a program branches to Step S807 in order to perform automatic rewinding.

In Step S806, it is detected that a rewinding button is depressed in order to perform the manual rewinding. If the depression is detected, rewinding is performed in Step S807. In Step S808, opening and closing operation of a rear cover is detected. If the rear cover is closed, idling is performed in Step S809 in order to automatically idle the film. The rewinding operation in Step S807 and the idling operation in Step S809 will be described later with reference to a flow chart shown in FIG. 19.

Sequence of exposure will next be described with reference to FIG. 18.

In Step S810, a sequence motor is driven to perform resetting-position driving of the clutch. By doing so, the clutch is changed over to a mirror driving system position. In Step S811, the sequence motor is driven in a direction opposite to that of the clutch changing-over to drive the MUSW until the MUSW is turned ON, thereby raising the mirror. In Step S812, the stop is restricted with a stop value which is previously computed.

In Step S813, the first blind and the last blind run at the shutter time which is computed previously, to perform exposure. In Step S814, the stop is driven to an opening position. In Step S815, the sequence motor is driven in a direction opposite to the clutch changing-over and is driven until the MUSW is turned OFF, whereby the mirror is lowered.

In Step S816, the sequence motor is driven to change over the clutch to the winding driving system position of the film. In Step S817, the sequence motor is driven in a direction opposite to the clutch changing-over to wind the film through a single frame.

In Step S818, the sequence motor is driven to change over the clutch to the mirror driving system position. In Step S819, the sequence motor is driven in a direction opposite to the clutch changing-over until the SCSW is turned ON to perform shutter charge.

Here, the shutter charge has been performed after the film winding. However, this is for bringing a state in which the clutch is changed over to the mirror driving system position at completion of the sequence, and the planetary gear of the clutch is in mesh with the driving gear. Thus, it is possible to reduce time lag upon mirror up of the subsequent release sequence.

Description will next be made with reference to FIG. 19.

First, sequence for performing rewinding will be described.

In Step S820, the sequence motor is driven to change over the clutch to the rewinding driving system position. In Step S821, the sequence motor is driven in a direction opposite to clutch changing-over to rewind the film.

At completion of the rewinding, the sequence motor is driven to change over the clutch to the mirror driving system position in Step S822.

In Step S823, the sequence motor is driven in a direction opposite to the clutch changing-over to perform mirror up, and mirror down in Step S824, and shutter charge in Step S825. By the fact that Step S822~Step S825 are performed, the aforesaid planetary gear of the clutch is brought to the mirror driving system position.

Subsequent to Step S826 is a sequence for performing automatic idling. The sequence motor is driven so that the clutch is changed over to the winding driving system position. In Step S827, the sequence motor is driven in a direction opposite to the clutch changing-over to wind the film through a single frame. Subsequently, branching is made to Step S822 similar to the rewinding completion to drive the clutch such that the clutch is in mesh with the mirror driving system position.

As described above, the main sequence of the camera has briefly been described with reference to FIG. 17~FIG. 19. However, a principle of a detecting mechanical section in the present invention will next be described in detail by the use of a flow chart.

First, flow charts illustrated in FIG. 20 to FIG. 24 will be described. These flow charts show initial driving of the sequence clutch, driving of the sequence clutch to a mirror driving system position, driving to a winding driving system position, and driving to a rewinding driving system position.

First, Step S871~Step S887 are initial setting for performing identification of sequence clutch changing-over operation by a flag. Setting thereof is shown in Table 1.

TABLE 1

|        | F UTY2 | F UTY1 | F UTY0 |                              |
|--------|--------|--------|--------|------------------------------|
| GPSINI | 0      | 0      | 0      |                              |
| GPSMIR | 0      | 0      | 1      |                              |
| GPSWD  | 0      | 1      | 0      |                              |
| GPSRW  | 0      | 1      | 1      |                              |
| GPSINIT| 1      | 0      | 0      |                              |
| GPSMIRT| 1      | 0      | 1      | FOR THE TIME OF ADJUSTING    |
| GPSWDT | 1      | 1      | 0      |                              |
| GPSRWT | 1      | 1      | 1      |                              |

That is, respective driving and driving of the initial driving system, the mirror driving system position, the winding driving system position and the rewinding driving system position are identified by F-UTY 0 and 1. Further, treatment or processing branches upon adjustment are caused to correspond respectively to the above-described four (4) kinds of driving and driving by F-UTY 2.

In Step S888, initial setting which is required for motor driving and detection of the photo-interrupter (PI) signal is performed. In Step S889 and in Step S890, branching is made to Step S906 upon initial driving of the sequence clutch. Furthermore, in Step S891~Step S893, branching is made to Step S901 when current position data are a mirror position (data are "1").

In Step S894~Step S895, identification data are saved to a stack area. In Step S896, sequence clutch initial driving is performed. In Step S897 and Step S898, the identification data are returned from the stack area.

In Step S899, if a damage flag is "1", branching is made to Step S934, and shifting is made to end processing. In Step S900, the initial setting is again performed. In Step S901 and Step S902, branching is made to Step S934 upon mirror position driving, and shifting is made to end processing.

In Step S903~Step S905, the number of driving pulses from the mirror position upon winding position driving and rewinding position driving is set. Upon the winding position driving, the number of pulses is set to "1", while, upon the rewinding position driving, the number of pulses is set to "2". In Step S906~Step S907, a timer for counting cycles by which the Pi signal is A/D-converted is set to 1 ms.

In Step S908, the sequence clutch changing-over motor 144 (SCM) is normally rotated to rotate the sequence clutch cam in a changing-over direction. In Step S909, counting of the 1 ms timer starts. In Step S910, waiting continues until counting of 1 ms ends. The 1 ms counting ends by the fact that an F-T2iF flag becomes "1".

In Step S911, the F-T2iF flag is cleared. In Step S912, an output signal from the SCPI 147 is A/D-converted to detect the last transition of the signal. In Step S913, the fact that the F-GPSDN flag is "1" indicates that there is a last transition in a signal of the SCPI 147. If there is no last transition, the program jumps up to Step S917.

In Step S914, the F-GPSDN flag is brought to "0". In Step S915, the number of driving pulses is subtracted by "1". In Step S916, if the number of driving pulses is brought to "0", the program jumps to Step S926 in order to complete the driving. In a case where the number of driving pulses is not "0", the program jumps to Step S917.

In Step S917~Step S920, limiter processing of driving time is performed. In a case where processing does not end even if one second elapses from the fact that the motor is driven, abnormality is considered in the output signal from the SCPI 147 or abnormality is considered in a mechanism. For this reason, damage processing is performed to perform release lock. In a case when the processing ends, branching is made to Step S908.

Step S921~Step S925 are processings for branching to damage.

First, in Step S921, a timer stops. In Step S922, the sequence motor 144 for performing the sequence clutch changing-over is turned off. In Step S923, a damage flag which indicates trouble of a sequence clutch mechanism is brought to "1".

In Step S924, branching is made to Step S934 during adjustment, in order that branching is made to damage processing so as not to perform the release lock. In Step S926, end processing at the time a last transition is counted through a predetermined number is performed, and braking is applied to the sequence motor 144. A method of applying the brake is performed by joint use of a short brake which electrically short-circuits both ends of the sequence motor 144 to perform braking, and a reverse-rotation brake in which voltage is applied for a predetermined period of time in a direction opposite to a direction of rotation of a motor which has conventionally been rotated, to perform braking.

In Step S927, branching is made to Step S932 upon driving of the winding position and the rewinding position. In Step S928, branching is made to Step S934 upon driving of the mirror position.

Step S929~Step S930 show processings upon initial driving.

First, the flag F-GPSiNi which indicates that the initial processing has once been performed is brought to "1". In Step S930, the F-UTY 0 flag is brought to "1" in order to set the positional data of the sequence clutch by processing to be described subsequently, to bring the flag to the mirror position data.

In Step S932 and Step S933, ADMAX is computed upon adjustment. In Step S934~Step S936, the positional data of the sequence clutch are "1", the winding positional data are "2", and the rewinding positional data are "3". In Step S937 and Step S938, the timer stops, and a return is made in Step S939.

Figure 25:
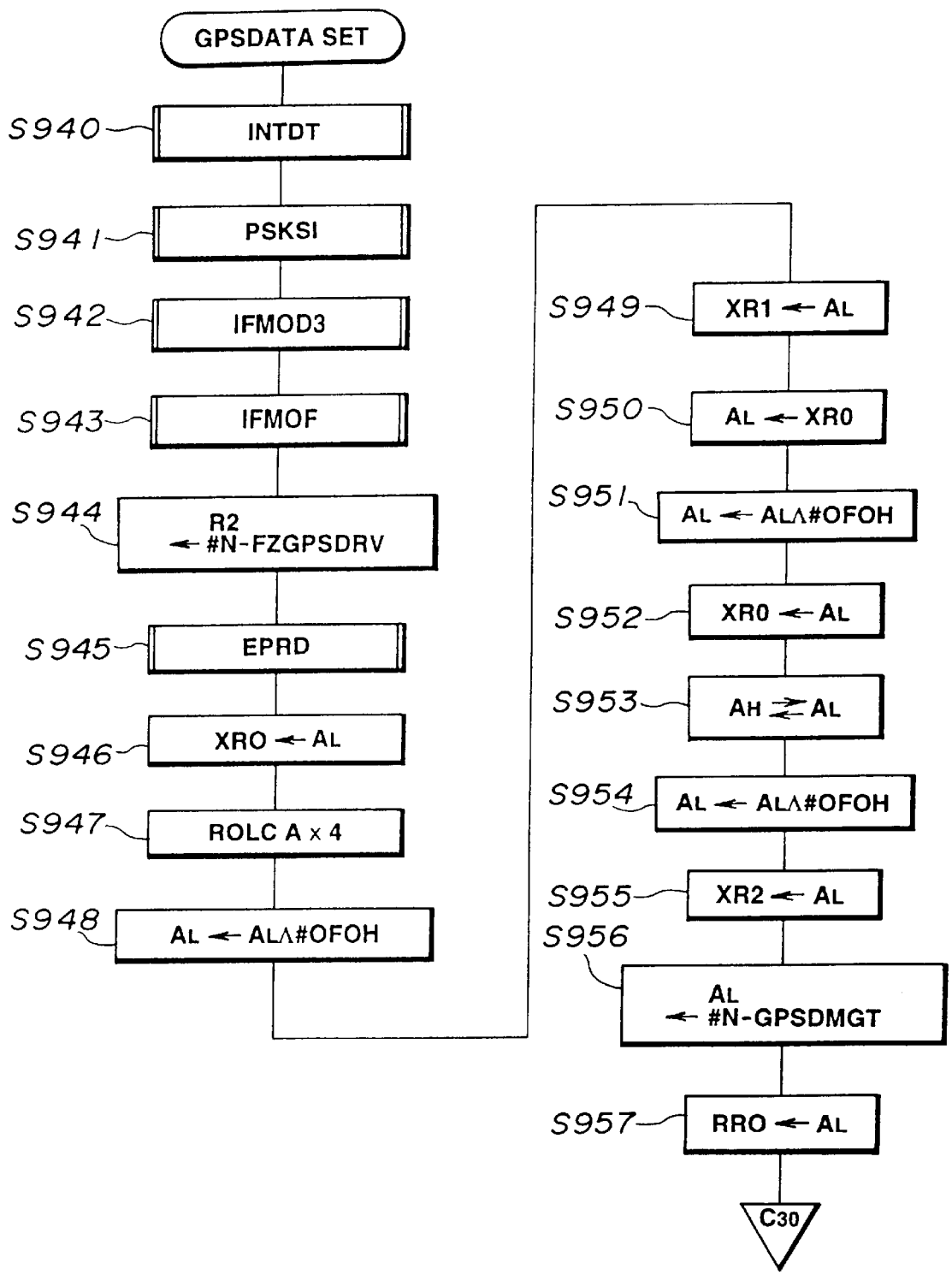
FIG. 25 is a flow chart showing a portion of initial setting processing operation for driving a sequence clutch mechanism in the camera to which the embodiment is applied.
Figure 26:
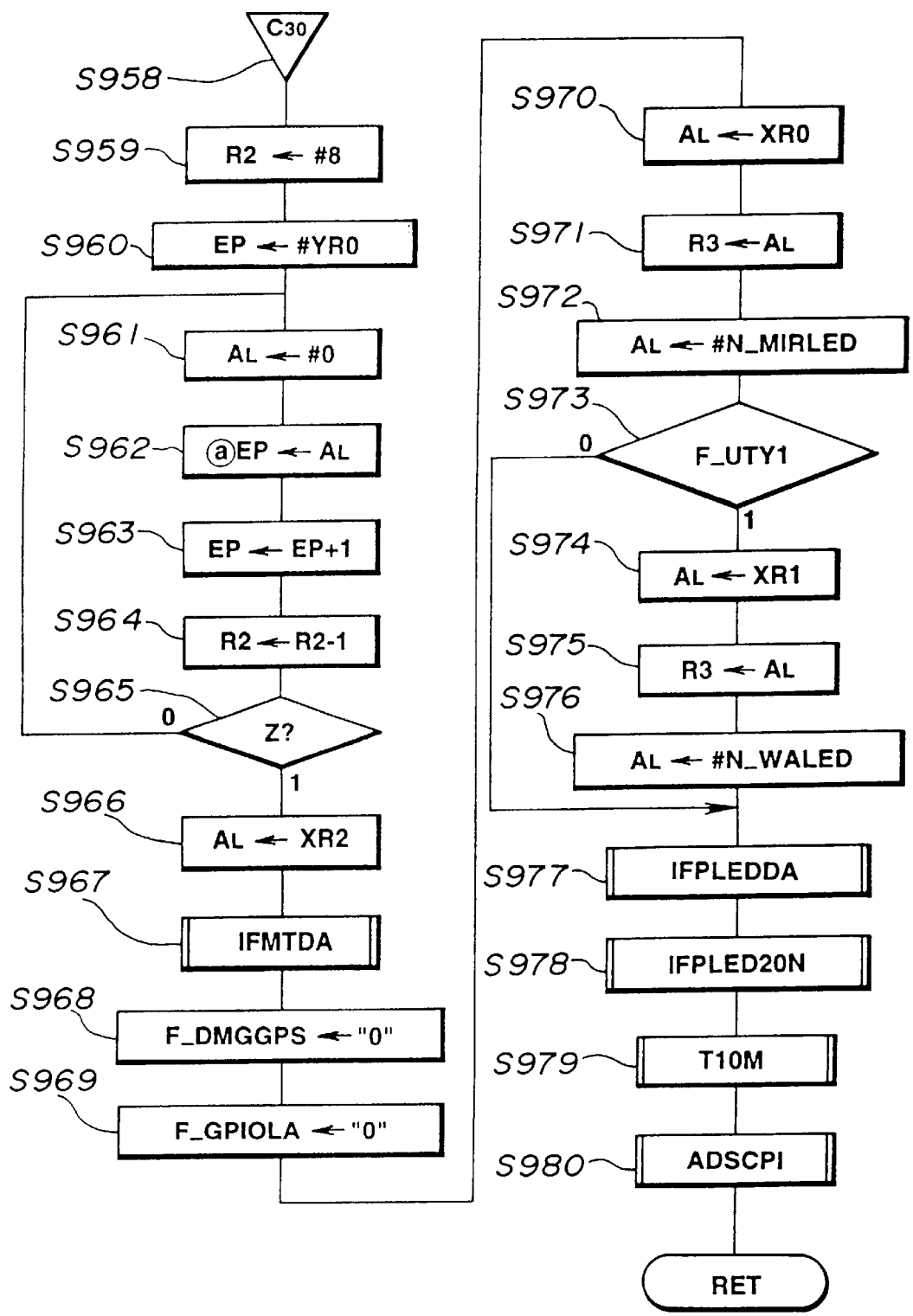
FIG. 26 is a flow chart showing the portion of the initial setting processing operation for driving the sequence clutch mechanism in the camera to which the embodiment is applied.

A flow chart shown in FIG. 25 and FIG. 26 will next be described. The flow chart shows initial setting for driving a sequence clutch mechanism.

First, in Step S940, setting of an interruption inhibiting level is performed. In Step S941, port setting is performed. In Step S942, initial setting of the interface IC 138 is performed. In Step S943, the motor driving circuit is turned off, since there is a case where the other motor is turned on.

In Step S944 and Step S945, the data are read from the EEPROM 135. In Step S946~Step S955, the data of the EEPROM 135 are developed in RAM within the CPU 120. A threshold judgment level upon driving of the winding and rewinding positions is set in the XR1 register. A threshold judgment level upon driving of the initial and mirror positions is set in the XR0 register. A motor driving voltage upon changing-over of the clutch is set in the XR2 register.

In Step S956 and Step S957, a count value is set for one second to the RRO register. In Step S958~Step S964, an adjusting RAM area is "0"-cleared. In Step S965 and Step S966, motor driving voltage of the XR2 register is set to the interface IC 138.

In Step S967, a damage flag for driving the sequence clutch is cleared. In Step S968, the previous data for judgment of last transition of the signal from the SCPI 147 are "0"-cleared. In Step S969~Step S976, judgment threshold values are set to an R3 register at every driving positions. A PiLED current value is set to the interface IC 138 at every driving positions.

In Step S977, light emission of the SCPI 147 is performed. In Step S978, light emission steady time of an LED of the SCPI 147 is awaited. In Step S979, the A/D conversion port is set, and returning is made in Step S980.

Figure 27:
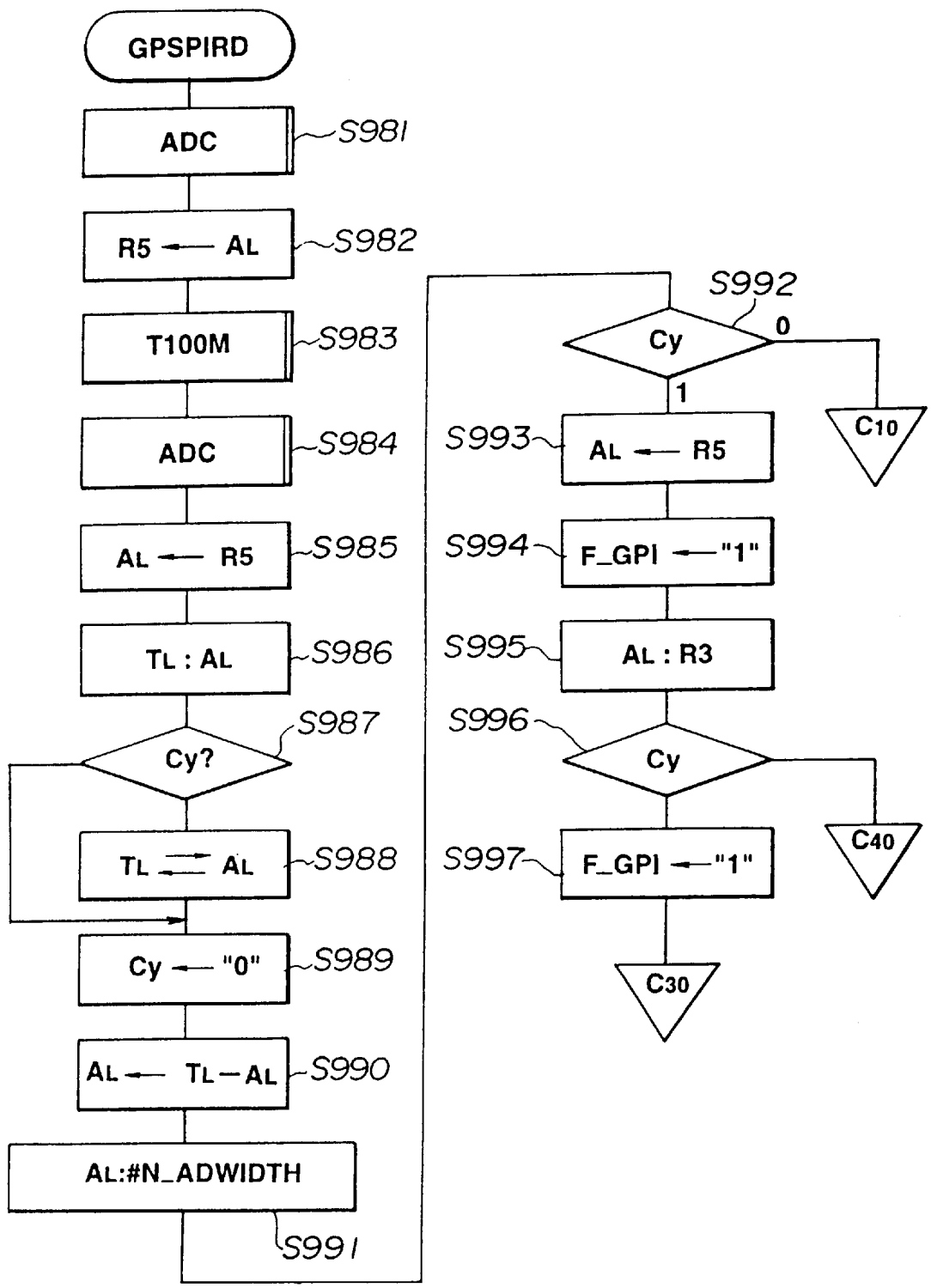
FIG. 27 is a flow chart showing a portion of a subroutine in which a signal of a photo-interrupter SCPI is A/D-converted to detect a trailing edge of a signal, upon changing-over driving of a sequence clutch, in the camera to which the embodiment is applied.
Figure 28:
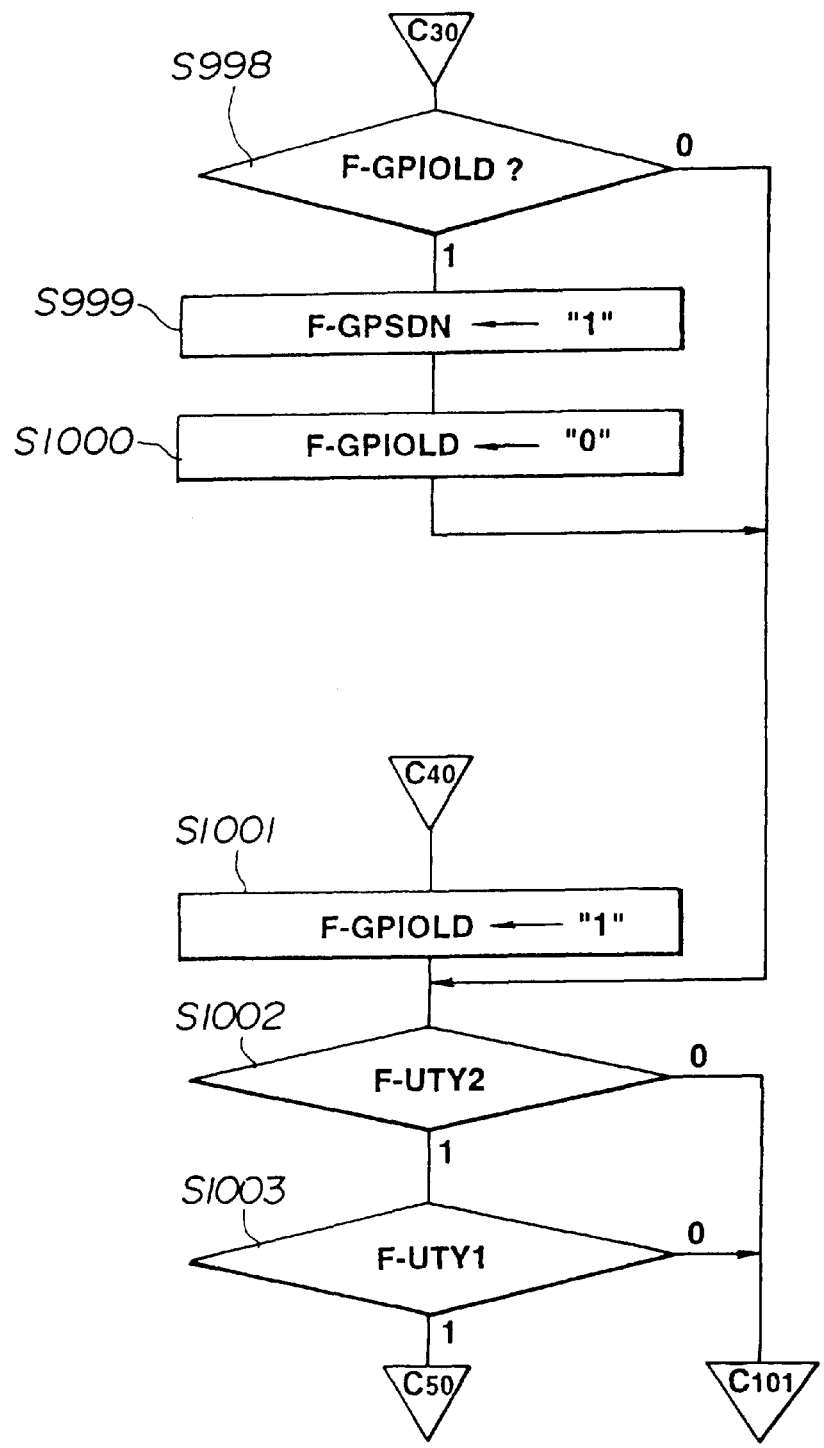
FIG. 28 is a flow chart showing the portion of the subroutine in which the signal of the photo-interrupter SCPI is A/D-converted to detect the trailing edge of the signal, upon changing-over driving of the sequence clutch, in the camera to which the embodiment is applied.
Figure 29:
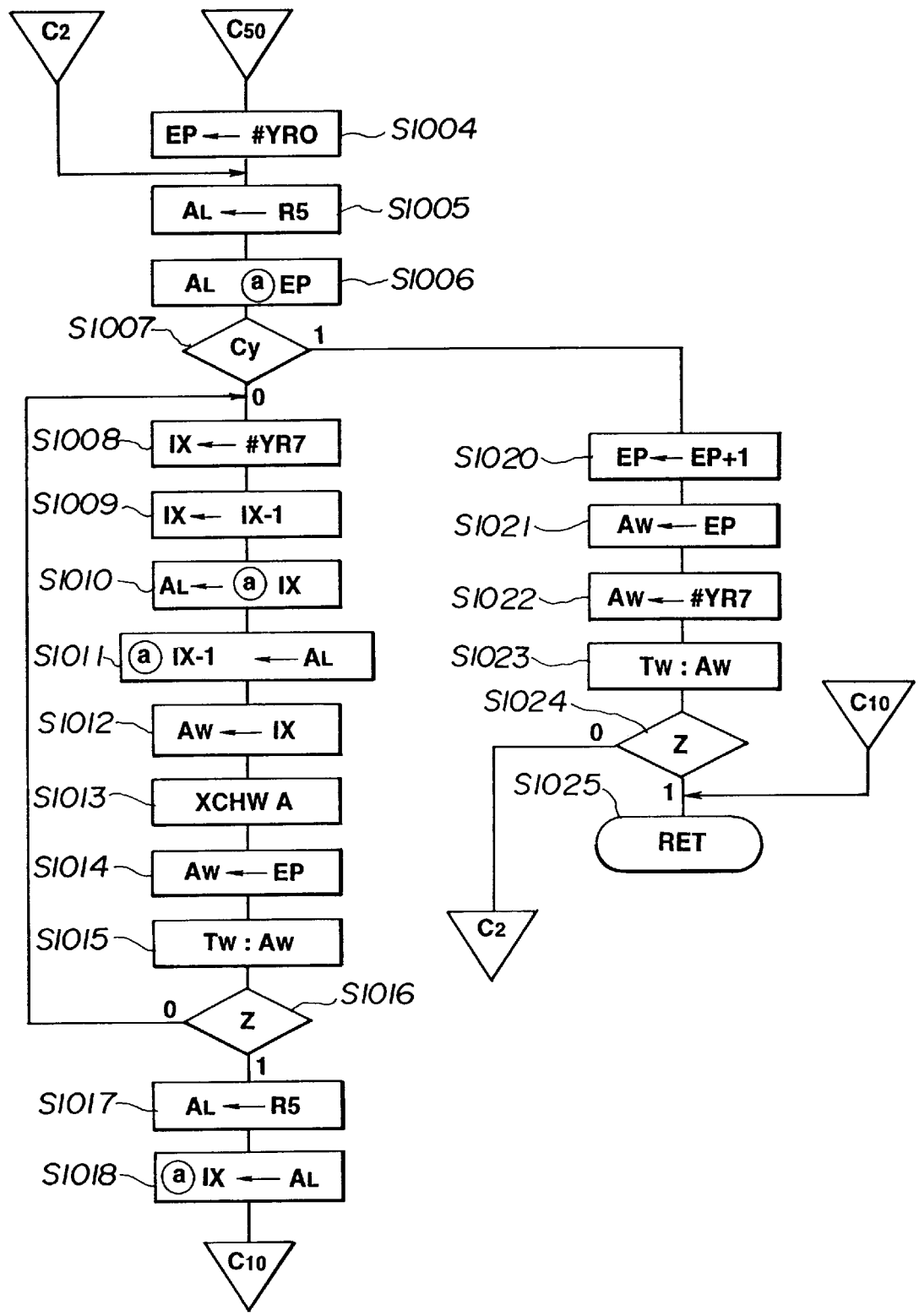
FIG. 29 is a flow chart showing the portion of the subroutine in which the signal of the photo-interrupter SCPI is A/D-converted to detect the trailing edge of the signal, upon changing-over driving of the sequence clutch, in the camera to which the embodiment is applied.

Flow charts shown in FIG. 27 to FIG. 29 will next be described. These flow charts show a subroutine in which the signal from the SCPI 147 at the time of the sequence clutch changing-over driving is A/D-converted to detect a last transition of the signal.

First, in Step S981, the A/D-conversion is performed at the previously set port. An A/D conversion result is set in an accumulator. In Step S982, the A/D conversion result is stored in an R5 register. In Step S983, delay of 100 μsec is performed and, thereafter, A/D conversion is again performed in Step S984.

In Step S985~Step S990, an absolute value of a difference of the result of two A/D conversions is computed. In Step S991 and Step S992, it is judged whether or not the absolute value is equal to or less than a predetermined value. When consideration is made by a voltage value, a difference equal to or less than 0.06 V is detected for or during 100 μsec. In a case where the difference is greater or larger than 0.06 V, this means that the signal from the SCPI 147 is on the way of changing-over, and such a sampling result at this time is ignored.

In Step S993~S997, it is judged whether the A/D value is equal to or higher or less than the threshold value which is beforehand set in the R3 register. When the A/D value is equal to or higher than the threshold value, it is judged as being an "H"-level. The F-GPi flag is brought to "1", and the program branches to Step S1001. When the A/D value is less than the threshold level, it is judged as being an "L"-level. The F-GPi flag is brought to "0", and branching is made to Step S998.

In Step S998~Step S1000, if the previous output from the SCPI 147 is "L", the program shifts to Step S1002. If the previous output from the SCPI 147 is "H", an output at this time is "L". Accordingly, this means that last transition is detected. The last transition flag F-GPiDN is brought to "1". The F-GPiOLD flag which means the previous output level is brought to "0", and branching is made to Step S1002.

In Step S1001, the A/D conversion value is the "H"-level and, accordingly, the last transition detection is not particularly performed. The F-GPiOLD flag which indicates the previous A/D value is brought to "1". In Step S1002, branching is made to Step S1003 during adjustment, while branching is made to Step S1025 during no adjustment and the program is returned.

In Step S1003, branching is made to Step S1025 and the program is returned during adjustment and upon the initial•mirror position driving.

Step S1004~Step S1024 are processings which are performed during adjustment and upon winding and rewinding position driving. That is, Step S1004~Step S1024 are processings in which sort processing of the A/D value is performed, and the sampled A/D values are rearranged eight in order from a large or great one.

First, in Step S1004, a range top address is set in an EP register. In Step S1004~Step S1007, data within the range and the A/D value are compared with each other. When the A/D value is greater than the data within the range, the program proceeds to Step S1008~Step S1016, and subsequent data are successively shifted.

In Step S1017~Step S1018, as a result of the shifting, the A/D value is stored in an empty location, and branching is made to Step S1025. In Step S1020~Step S1024, it is judged whether or not retrieval is made to the end of the range.

Figure 30:
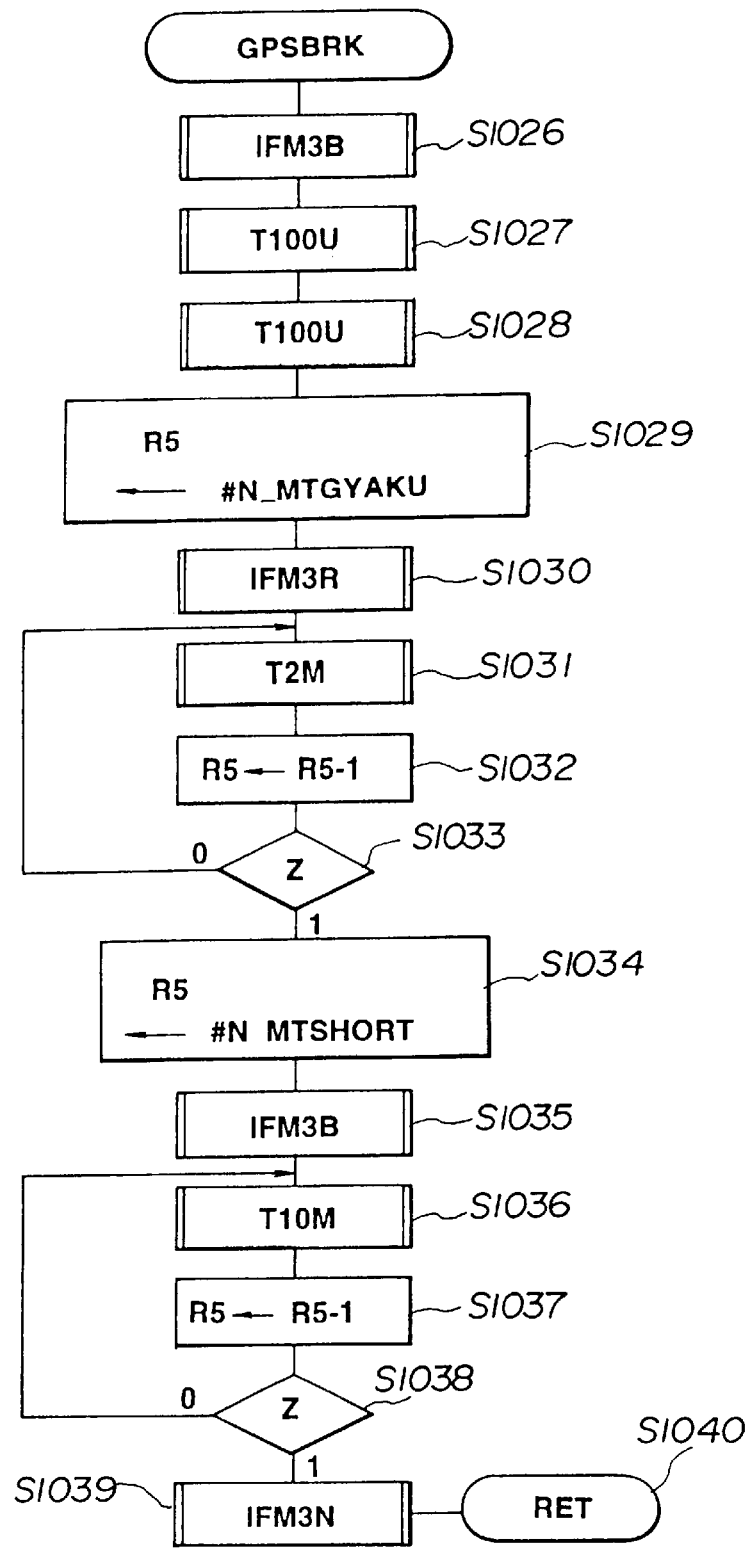
FIG. 30 is a flow chart showing a brake processing operation of a sequence clutch driving motor, in the camera to which the embodiment is applied.

A flow chart shown in FIG. 30 will next be described. The flow chart shows brake processing of a sequence clutch driving motor.

First, in Step S1026, short braking is applied to the sequence motor 144. In Step S1027 and Step S1028, after 200 μsec, reverse rotational braking is applied for 10 msec in Step S1029~Step S1033.

In Step S1034~Step S1038, short braking is applied for 50 msec. Subsequently, in Step S1039, the sequence motor 144 is turned off. In Step S1040, returning is performed.

Figure 31:
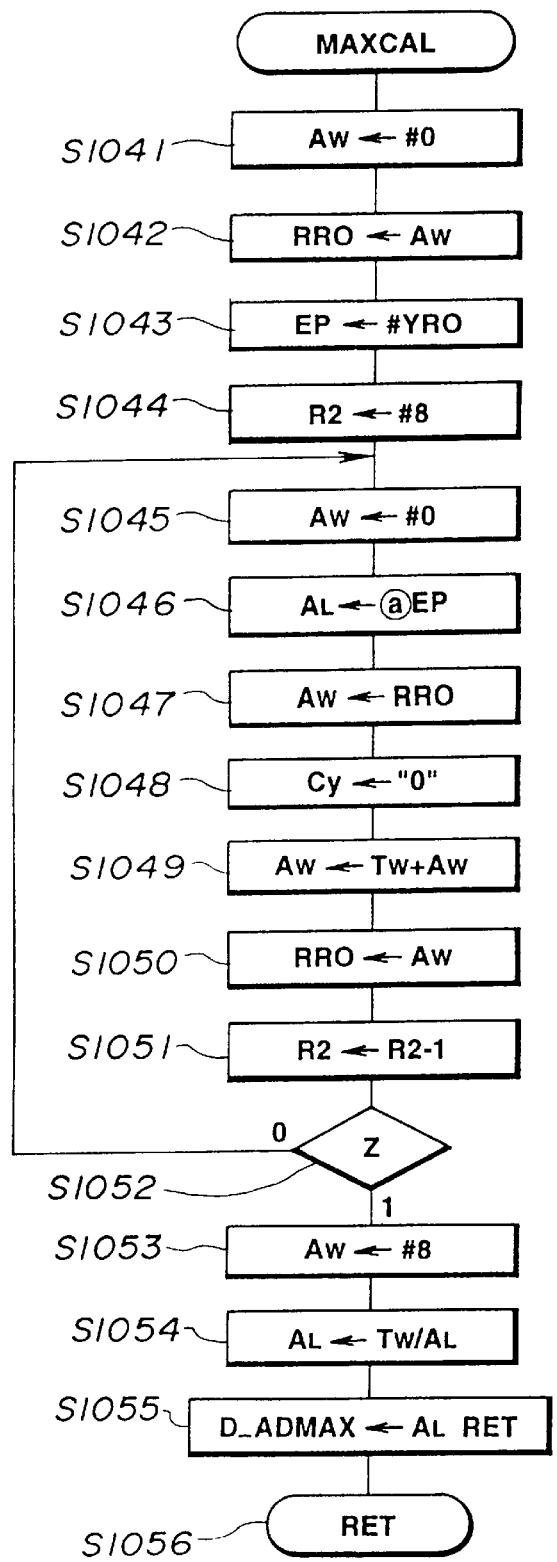
FIG. 31 is a flow chart showing a processing operation which performs mean or average of sorted A/D values in the camera to which the embodiment is applied.

A flow chart shown in FIG. 31 will next be described. The flow chart shows processing which performs average or mean of the sorted A/D value.

First, in Step S1041~Step S1044, initial setting is performed. In Step S1045~Step S1052, the sum of the data in the range is computed. In Step S1053~Step S1055, the sum is divided by 8 to produce a mean value, and an ADMAX value is stored in a predetermined RAM area. In Step S1056, returning is performed.

Figure 32:
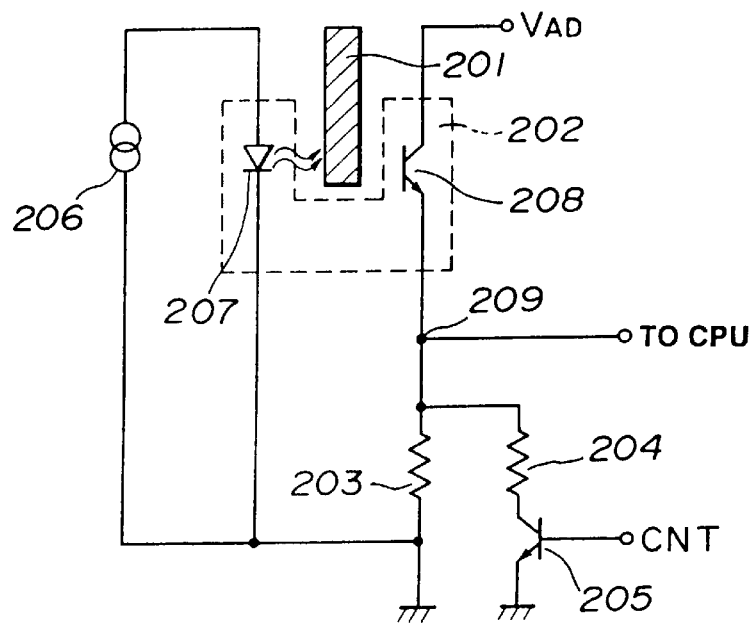
FIG. 32 is an electric circuit view showing an arrangement of a principal portion in a state detecting mechanism according to a modification of the first embodiment of the invention.

FIG. 32 is an electric circuit view showing an arrangement in the vicinity of a photo-interrupter in a state detecting mechanism that is a modification of the aforesaid first embodiment, and corresponds to FIG. 10 in the first embodiment.

Here, a clutch lever 201 has similarly three different kinds of transmissivity, and a part of the clutch lever 201 is arranged within a photo-interrupter (PI) 202. The PI 202 is formed by an LED 207 and a phototransistor 208. The LED 207 is turned on at constant current by a power source portion 206. A pair of resistors 203 and 204 for converting the generated current to voltage are provided on the side of the phototransistor 208. The resistor 203 is a resistor which always becomes a path of photoelectric current. However, a transistor 205 is connected to the resistor 204 in series thereto.

The transistor 205 has a base terminal thereof which is controlled by a control circuit. Thus, the resistor 204 is connected to the photoelectric current path in parallel to the resistor 203. That is, if values of the resistor 203 and the resistor 204 are equal to each other, the resulting resistor value is reduced by about ½ when the transistor is turned on. Here, the embodiment is similar to the first embodiment in that a CPU monitors a point 209. Accordingly, even though the same or identical photoelectric current is provided by transistor 208, a value thereof changes if a resistant value due to the resistors 203 and 204 changes.

As will be clear from the foregoing, the values of the respective resistors 203 and 204 are suitably set whereby it is possible to produce two different kinds of outputs as shown in FIG. 13 and FIG. 14 in the first embodiment.

Accordingly, in the flow chart illustrated in the aforementioned first embodiment, the transistor 305 is controlled at the time corresponding to the changing-over of the LED current in the photo-interrupter PI, whereby it is possible to secure similarly stable judgment.

As described above, if the state detecting mechanism according to the first embodiment or according to the modification of the first embodiment is used, the mechanical driving within the body which normally uses a pair of motors or a complicated clutch mechanism can be performed by a small-size clutch which only uses a single motor and a single sensor, in a single-lens reflex camera. Thus, the first embodiment and the modification of the first embodiment largely contribute to down-sizing and/or reduction in cost of the entire camera.

Further, the description due to the flow charts explains only photographing operation which changes over the clutch portion actually. However, as will be clear from FIG. 15, when the LED current passes about by 10 mA, it is needless to say that the output value corresponding to the initial position exists at only one location; accordingly, in a case where confirmation of the present or actual condition is required by operation such as resetting or the like, the clutch is rotated; and, even under a state in which a last transition is not detected but stops, only judgment of the output value makes possible judgment of the initial position or a range other than the initial position.

An engaging mechanism that is a second embodiment of the invention will next be described.

Figure 33:
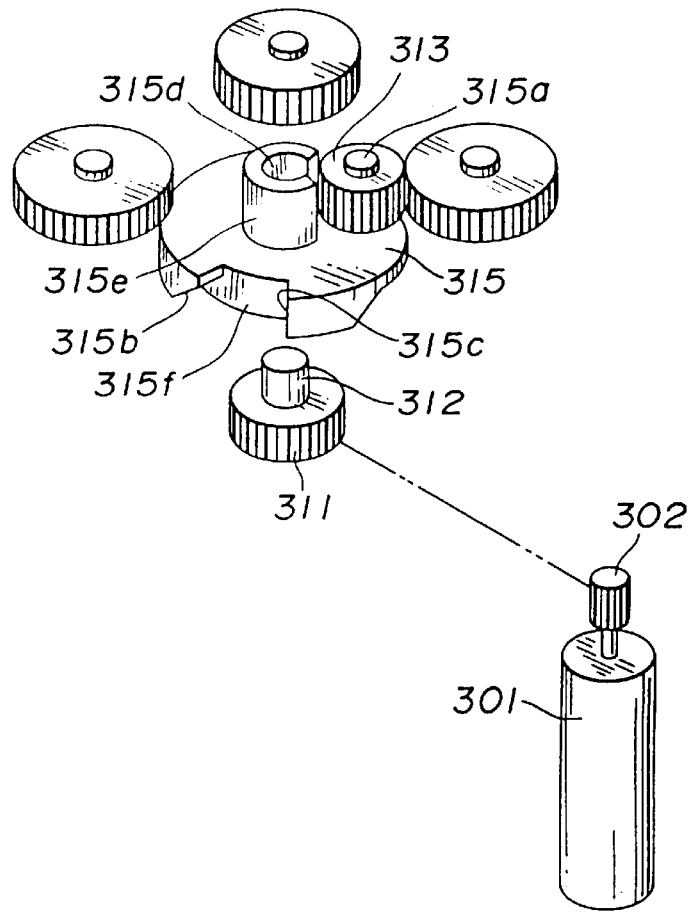
FIG. 33 is a perspective view showing an engaging mechanism in a second embodiment of the invention.

FIG. 33 is a perspective view showing the engaging mechanism according to the second embodiment.

A motor 301 is a motor which can normally and reversely rotate, and which has a pinion 302 arranged on an output shaft. The pinion 302 is in mesh with a gear 311 through a speed-reduction gear train (not shown), and is so arranged as to transmit rotational force of the motor 301 to the gear 311. A sun gear 312 in which a support or pivot shaft is common is integrally formed, on an upper portion of the gear 311.

A wheel (ratchet wheel) 315 having ratchet function is a disc-like configuration having a given thickness. A cut-out 315f is provided on a single location on an outer periphery. One sidewall of the cut-out 315f forms a vertical wall 315c, while the other sidewall forms a cam surface 315b which tapers downwardly.

A central portion of the ratchet wheel 315 is formed with a columnar inserting bore 315d. A cylindrical portion 315e which has inner diameter conforming in shape to the inserting bore 315d is provided at a central portion on an upper surface of the ratchet wheel 315 in suspension in integral relation to the ratchet wheel 315. The sun gear 312 is so adapted to be inserted into the inserting bore 315d for angular (i.e. rotational) movement. The cylindrical portion 315e has a peripheral surface thereof at a portion of which a cut-out is formed. The fitted sun gear 312 is so arranged as to be fitted to mesh with the planetary gear 313 which is mounted on a pin 315a joined to ratchet wheel 315 for angular movement, which is provided vertically at a position which is opposed to the cut-out adjacent to one end of the upper surface of the ratchet wheel 315.

A planetary gear 313 has slight friction (omitted from illustration) between the planetary gear 313 and the upper surface of the ratchet wheel 315, and is in mesh also with the sun gear 312 as described above. Accordingly, the ratchet wheel 315 is also be rotated.

Figure 34:
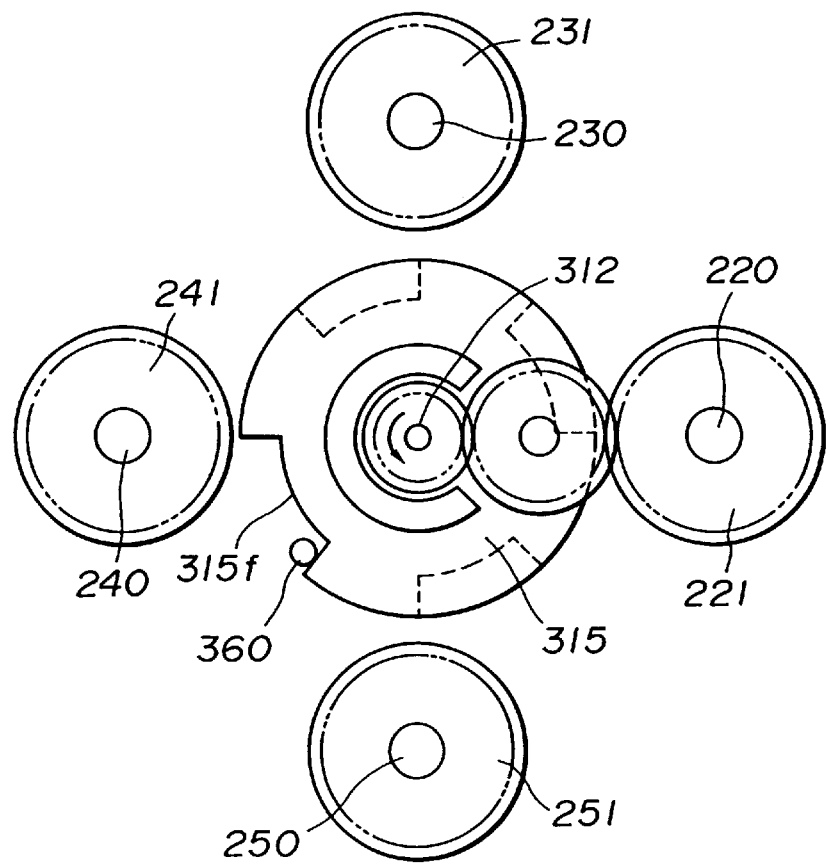
FIG. 34 is a top plan view showing the engaging mechanism according to the second embodiment.

A shaft 220 and a shaft 240, and a shaft 230 and a shaft 250 (not shown in FIG. 33) are provided vertically at positions opposite to each other, which are equal to each other in distance horizontally from the sun gear 312, as shown in FIG. 34. Drive-system gears 221, 231, 241 and 251 are mounted respectively on these shafts. These driving-system gears are connected respectively to various kinds of driving shaft systems and serve as a driving source therefor to be described subsequently.

A click stopper 360 is provided vertically below wheel 315 at a single location on a rotational arcuation of a cut-out 315f in ratchet wheel 315.

Figure 35:
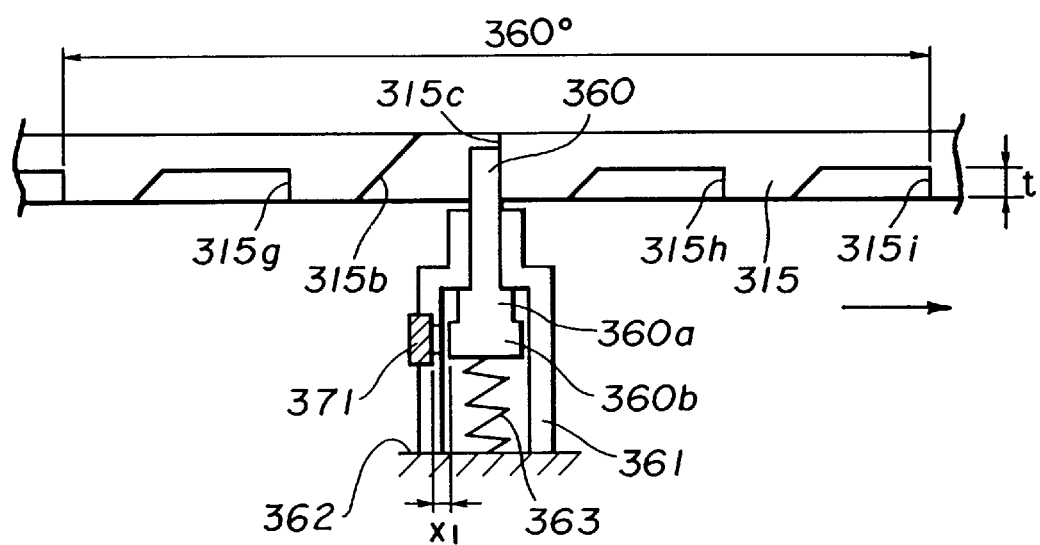
FIG. 35 is a development view in which a ratchet wheel is developed circumferentially, centering around a click stopper in the engaging mechanism according to the second embodiment.

FIG. 35 is a development view in which the ratchet wheel 315 is developed circumferentially on a center of the click stopper 360. In this connection, FIG. 35 shows the relationship between the ratchet wheel 315 and the click stopper 360 at the time the planetary gear 313 is in mesh with the driving system gear 221 as shown in FIG. 34.

The click stopper 360 is held or retained slidably vertically on a guide holder 361, and is biased in an upper direction by a spring 363 which is arranged between a pedestal 362 and a lower surface of the click stopper 360. The arrangement is such that, when the ratchet wheel 315 is rotated, and when the click stopper 360 reaches the cut-out, the click stopper 360 is pushed upwardly by the biasing spring 363.

Further, the click stopper 360 has a first flange portion 360a slightly larger in outer diameter, at a location below a shaft portion which is engaged with the ratchet wheel 315, and a second flange portion 360b having an outer diameter thereof substantially equal to an inner diameter of the guide holder 361, at a location further below the first flange portion 360a.

It has been described that a state in FIG. 35 in which the already described spring 363 is abutted against the lower surface of the second flange portion 360b is a meshing state corresponding to FIG. 33 and FIG. 34. In the present embodiment, however, a gear 221 is a first stage gear of a shutter•mirror system (not shown), and is an initial stand-by position of the present machine.

The gear 231 is a first stage gear of a winding system, and angularly moves a spool (not shown) in a winding direction. The gear 241 is a first stage gear of a rewinding system, and angularly moves a fork gear (not shown) in a rewinding direction. These gears 221, 231 and 241 which all drive mechanism equivalent to those of the first embodiment.

In the first embodiment, the driving system has been changed over to three kinds by the sequence clutch. In the present embodiment, however, a single system is further provided to enable changing-over to four systems.

The gear 251 is an initial stage gear of a delivery system. What is the delivery is one which corresponds to a patrone of type which has a mechanism for delivering a film by itself which has variously been proposed in recent years. That is, since the delivery system is a system which is capable of angularly moving a shaft within the patrone in a film delivery direction, the delivery system is one which angularly moves a fork gear (not shown) in a direction opposite to that at the time the planetary gear is in mesh with the gear 241.

Well, operation at the time the sequence clutch is changed over will be described on the basis of FIG. 35~FIG. 38.

In FIG. 34, when a sun gear 312 is angularly moved in a direction indicated by an arrow, an engaging surface of the ratchet wheel 315 is released from the stopper 360 by friction which is provided on the planetary gear, and is angularly moved in a direction indicated by an arrow in FIG. 35.

A cam surface 315b is abutted against the stopper 360 in keeping with movement of the ratchet wheel 315 in a direction indicated by an arrow. The stopper 360 is biased upwardly by spring 363. However, the cam surface 315b has a slope or inclination which is adequate for the fact that the stopper 360 is moved downwardly against the spring force. In keeping with movement of the wheel 315, the stopper 360 is gradually moved downwardly.

Figure 36:
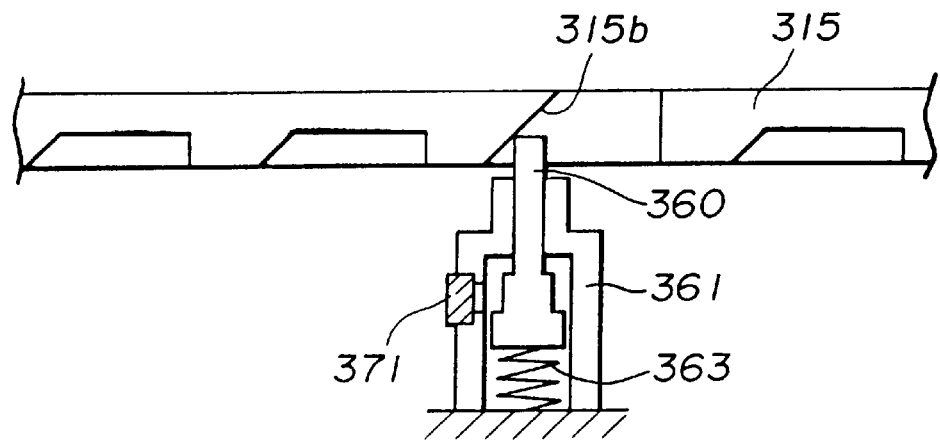
FIG. 36 is a development view in which the ratchet wheel is developed circumferentially, centering around the click stopper in the engaging mechanism according to the second embodiment.

A figure which shows this state is FIG. 36. When the angular movement further progresses from the state illustrated in FIG. 36, the relationship between the stopper 360 and the wheel 315 reaches a state in FIG. 37. This state is a state under which lowering due to the cam surface is completed, and the stopper 360 is abutted against the lowermost surface of the wheel 315. The spring 363 is a state which is mostly charged.

Under this state, if the motor 301 is reversely rotated, the wheel 315 does not still reach a new engaging surface with respect to the stopper 360. Accordingly, the wheel 315 is again abutted against an engaging surface 315c having a cut-out, and the planetary gear is again in mesh with the initial position. In the actual control, the motor further continues to be rotated. Then, the relationship between the stopper 360 and the wheel 315 reaches FIG. 38. The stopper 360 passes through the lowermost surface of the wheel 315, and rises to a subsequent engageable position.

By the way, the ratchet wheel 315 is such that, as shown in FIG. 35, a portion thereof is cut out, and the other three locations have a planar surface at a location which is displaced from the lowermost surface by a height t. That is, in a state illustrated in FIG. 35, a position of the stopper 360 is determined or decided on the basis of the relationship between the stopper 360 and the guide holder 361. In a state illustrated in FIG. 38, however, the position of the stopper 360 is regulated or controlled by a planar surface portion of the wheel 315. Of course, the stopper 360 is spring-biased with respect to the wheel 315 also during the changing-over period of time illustrated in FIG. 36 and FIG. 37.

Figure 38:
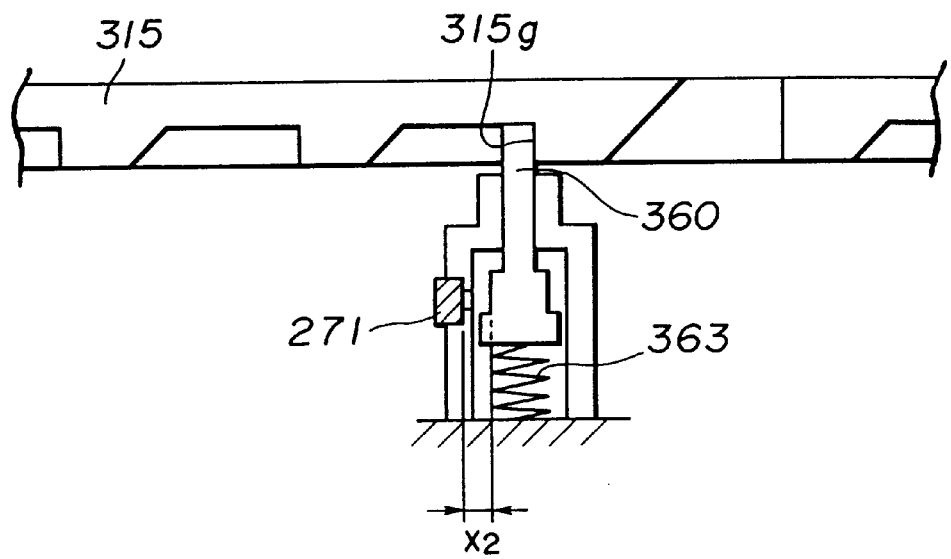
FIG. 38 is a development view in which the ratchet wheel is developed circumferentially, centering around the click stopper in the engaging mechanism according to the second embodiment.

If the motor is reversely rotated in the driving direction under the state shown in FIG. 38, the engaging surface 315g is engaged whereby the planetary gear is in mesh with the gear 231, and angularly moves the spool in a winding direction.

In this manner, it is possible to transmit the power to the driving systems of the four locations in an alternative way by the relationship between the wheel 315 and the stopper 360.

Well, in the arrangement of the present camera, the stopper 360 becomes a free state only when the initial position is engaged, while the stopper 360 is regulated by the planar surface which is displaced a height t from the lowermost surface when the other positions (three) are engaged. Accordingly, if the state of the stopper can be detected, it is possible to detect, in the absolute position, the initial position.

In FIG. 35, the reference numeral 371 denotes a detecting element which is arranged on the opening which is provided on a portion of the guide holder 361 so as to be capable of monitoring the interior thereof.

In the present embodiment, the detecting element is formed by a photo-reflector (PR), and an output therefrom is inputted to a processing circuit by a flexible printed circuit board or the like (not shown).

The photo-reflector PR 371 is one in which light intensity projected by an LED is reflected to a subject whereby an output is produced. However, now, if FIG. 35, FIG. 37 and FIG. 38 are compared with each other, a clearance of x1 occurs between the photo-reflector PR 371 and the second flange portion 360b which is opposed against the photo-reflector PR 371 under the initial position state illustrated in FIG. 35.

Figure 37:
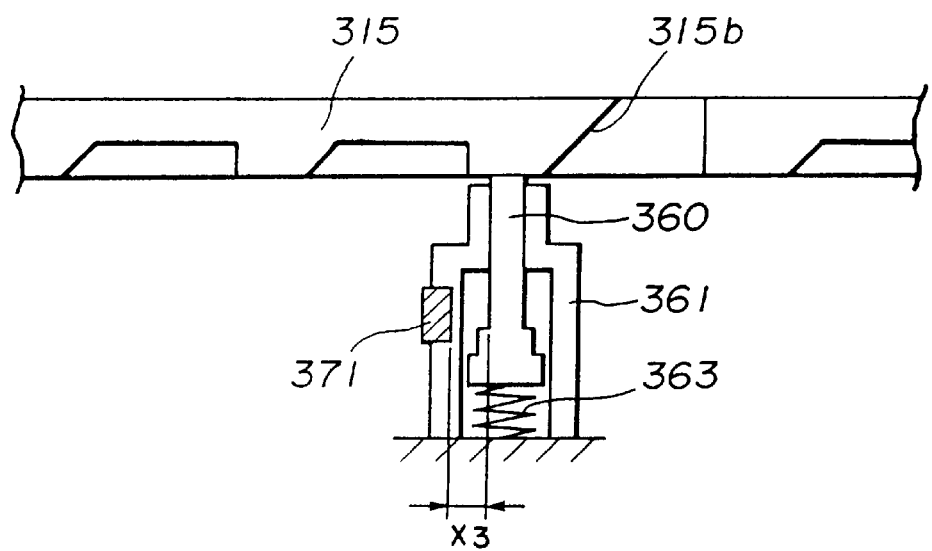
FIG. 37 is a development view in which the ratchet wheel is developed circumferentially, centering around the click stopper in the engaging mechanism according to the second embodiment.

However, under the changing-over state in FIG. 37, the stopper 360 is pushed downwardly, whereby a portion opposed against the photo-reflector PR 371 becomes a diameter the same as an engaging shaft portion of the stopper 360. The clearance becomes x3.

Seeing the state of the other engaging surfaces in FIG. 38, one opposed against the photo-reflector PR 371 is the first flange portion 360a having an intermediate diameter. Thus, the clearance becomes x2.

Here, x1, x2 and x3 are set such that x2 can produce an output of about 50%, and x3 can produce an output of about 10% with respect to an output of x1 which resides in the nearest distance.

As will be clear from the foregoing, an output corresponding to x1 is outputted only in a range in which the initial position is capable of being engaged. Accordingly, the PR output is confirmed even after the changing-over and during the driving, whereby detection of the absolute position is made possible.

Figure 39:
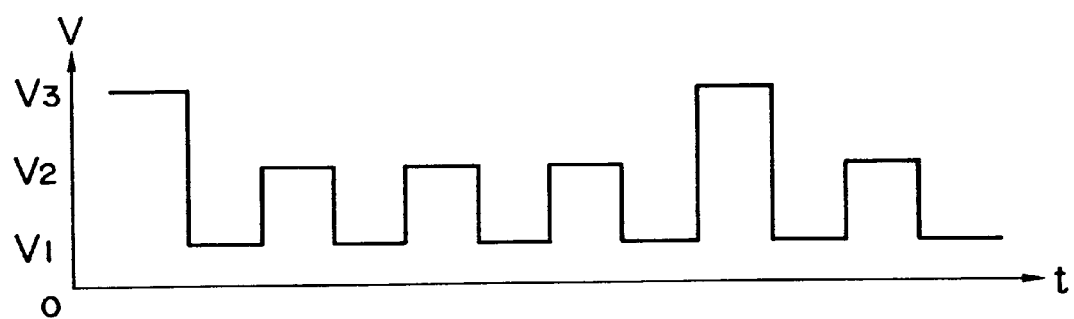
FIG. 39 is a diagram showing an output signal from a photo-reflector in the engaging mechanism according to the second embodiment.

An output from the photo-reflector PR 371 in a case where the ratchet wheel 315 is continuously rotated in the changing-over direction is shown in FIG. 39. In this connection, what is the output here shows one which is converted to a voltage value which is inputted to the CPU shown in FIG. 11 and FIG. 12 in the photo-interrupter PI of the first embodiment.

An output waveform in FIG. 39 is one in a case where supply current to the LED of the photo-reflector PR 371 is made constant so that the wheel is rotated. The clearance of a portion to be inspected and the output from the photo-reflector PR correspond to x1→V3, x2→V2 and x1→V1.

That is, V3 corresponds only to the initial position. A last transition of V1 to V3 which corresponds to the changing-over section or interval is detected, whereby control to the initial position is made possible.

Moreover, the other engaging positions are capable of being controlled by the fact that last transition pulses from the initial position are counted.

Detailed operation in a case where the embodiment is actually used in the camera or the like is omitted here. However, it is needless to say, it is preferable that the supply current on the side of the LED of the photo-reflector PR is changed over to perform more stable detection, regarding detection, similar to the first embodiment.

As described above, if the present embodiment is used, also in the stopper of pin type which only advances and which is retracted in a direction substantially the same as the rotary shaft of the sequence clutch, detection of the relative position between the engaging surface and the stopper makes detection of the absolute position possible. Thus, the invention can provide a mechanism which is extremely small in size and which is low in cost.

Moreover, the second embodiment shows an example in which a distance between the photo-reflector and the section to be detected changes. However, it is needless to say that there can be produced similar advantages if the arrangement is such that portions to be detected equal to or more than in number having different reflection factors from each other are formed, and the distance between the photo-reflector and the section to be detected is identical similar to the fact that three kinds of transmissivity and transmissivity are formed on the portion to be inspected in the first embodiment.

As described above, if the above-described embodiment is used, it is possible to provide an engaging mechanism capable of detecting the absolute position by an extremely simple arrangement, by the fact that the relationship between the initial position and the other engaging positions is possible to be detected by the fact that the relative position between the elements which engage with the initial position and the other engaging positions is changed, and is monitored by a single sensor, in the engaging mechanism which has the plurality of engaging positions.

In connection with the above, the above-described embodiments disclose examples in which the present invention is applied to a camera. Of course, however, the above-described embodiments should not be limited to use in a camera, but are extremely effective for any mechanisms which have a plurality of engaging positions.

Furthermore, the level of the initial position is brought to a level which is not outputted upon shift to the other engaging positions. Accordingly, it is possible to provide an engaging mechanism which is extremely strong for noises or the like and which is steady.

In this invention, it is apparent that working modes different in a wide range can be formed on the basis of this invention without departing from the spirit and scope of the invention. This invention is not restricted to any specific embodiment except as may be limited by the appended claims.

What is claimed is:

1. A clutch mechanism comprising:
    a planetary gear for transmitting power of a driving source;
    an engaging element for regulating revolution of said planetary gear at a plurality of predetermined engaging positions;
    detecting means for detecting a position of said engaging element; and
    a section to be detected provided on said engaging element, for providing a unique output value to said detecting means, only when said planetary gear is in an initial position which output value is different from output values obtained at a plurality of engaging positions of said planetary gear other than said initial position.

2. A clutch mechanism according to claim 1, wherein said planetary gear is selectively engaged in revolution by said engaging element such that said planetary gear is revolved by rotation of said driving source in one direction, and is rotated by rotation of said driving source in another direction.

3. A clutch mechanism according to claim 1, wherein, in a case where revolution of the planetary gear occurs, said planetary gear sequentially meshes with each one of a plurality of gears to be driven.

4. A clutch mechanism according to claim 1, wherein said detecting means is a photoelectric sensor.

5. A clutch mechanism according to claim 1, wherein an output value peculiar to said detecting means when the planetary gear is at the initial state is a maximum value or a minimum value of possible output values in all engaging states of said planetary gear.

6. A clutch comprising:
   a clutch mechanism for performing a clutch changing-over operation or a power transmission depending upon a rotational direction of a driving source driving said clutch mechanism;
   at least three kinds of systems to be driven to which power of said driving source is selectively transmitted by a changing-over operation of said clutch mechanism;
   detecting means for detecting each changing-over state of said clutch mechanism; and
   control means for controlling said driving source such that a series of sequences end by controlling said driving source to rotate in a power transmitting direction regardless of the state of said clutch mechanism, said clutch mechanism including means for causing the detecting means to generate a given signal when said clutch mechanism is in an initial state, which given signal is different from signals generated when said clutch mechanism is in any other state.

7. A clutch according to claim 6, wherein said clutch mechanism is formed by a planetary gear and an engaging mechanism.

8. A driving-force transmitting apparatus comprising:
   driving means for generating a driving force;
   changing-over means movable to three different states for selectively transmitting the driving force of said driving means to at least three different means to be driven; and
   detecting means for detecting which means is to be driven by the driving force of said driving means, said detecting means being capable of outputting a plurality of different signals of said changing-over means, each state being associated with one of the three different means to be driven.

9. A driving-force transmitting apparatus according to claim 8, wherein said detecting means includes light emitting means, light receiving means for receiving light from said light emitting means, and light control means for controlling an intensity of light from said light emitting means, in accordance with a changing-over state of said changing-over means.

10. A driving-force transmitting apparatus according to claim 9, wherein said light emitting means and said light receiving means are formed by a photo-interrupter, and wherein said light control means includes shielding means by which light emitted from said light emitting means is at least shielded, means through which at least a portion of the light passes, and passing means through which all of the light passes.

11. A driving-force transmitting apparatus according to claim 9, wherein said light emitting means and said light receiving means are formed by a photo-reflector, and wherein said light control means includes reflecting means by which light emitted from said light emitting means is reflected, said reflecting means having a plurality of reflecting portions.

12. A driving-force transmitting apparatus according to claim 11, wherein said plurality of reflecting portions have reflectance factors different from each other.

13. A driving-force transmitting apparatus comprising:
    driving means for generating a driving force;
    drive force changing-over means for selectively transmitting the driving force of said driving means to one of at least three means to be driven; and
    detecting means for detecting which of said means is to be driven by the driving force of said driving means under control of said driving force changing-over means, said detecting means including light emitting means and light receiving means for receiving light from said light emitting means, said detecting means being capable of outputting a plurality of different signals in accordance with a state of a light control means which state is responsive to a selection of said drive force change-over means for controlling an intensity of light which is detected by said detecting means.

14. A driving-force transmitting apparatus according to claim 13, further including light-intensity varying means, said light-intensity varying means varying an intensity of light emitted by said light emitting means in order to distinguish a given signal of said plurality of different signals from remaining ones of the plurality of different signals.

15. A driving force transmitting apparatus according to claim 13 wherein said detection means compares a signal outputted from the light receiving means with a threshold level, and further including a threshold changing means for changing a threshold level of said detection means responsive to a given output of the detection means.

16. A driving force transmitting apparatus according to claim 13 further including an output circuit coupled to said light varying means including means for changing an output signal level of said light receiving means responsive to a given output signal level.

17. A driving force transmitting apparatus according to claim 16 wherein said output changing means include means to change an impedance of said output circuit.

18. A driving force transmitting apparatux according to claim 17 wherein said impedance changing means includes a transistor for selectively switching impedance of the output circuit.

* * * * *